US006445365B1

(12) United States Patent
Taniguchi et al.

(10) Patent No.: US 6,445,365 B1
(45) Date of Patent: *Sep. 3, 2002

(54) IMAGE DISPLAY APPARATUS AND IMAGE PHOTOGRAPHING APPARATUS THEREFOR

(75) Inventors: Naosato Taniguchi, Machida; Susumu Matsumura, Kawaguchi; Yoko Yoshinaga, Machida; Shin Kobayashi, Atsugi; Toshiyuki Sudo, Kawasaki; Hideki Morishima, Tokyo; Tadashi Kaneko, Isehara, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/950,507

(22) Filed: Sep. 16, 1997

Related U.S. Application Data

(63) Continuation of application No. 08/217,986, filed on Mar. 25, 1994, now abandoned.

(30) Foreign Application Priority Data

| Mar. 29, 1993 | (JP) | ............................................. 5-069937 |
| Jul. 16, 1993 | (JP) | ............................................. 5-176777 |
| Mar. 18, 1994 | (JP) | ............................................. 6-048645 |

(51) Int. Cl.⁷ ................................................ G09G 5/00

(52) U.S. Cl. ................................ 345/9; 345/3.1; 345/7

(58) Field of Search ............................ 434/44; 345/3.1, 345/7, 9

(56) References Cited

U.S. PATENT DOCUMENTS 4,028,725 A * 6/1977 Lewis ........................ 348/115
4,348,185 A * 9/1982 Breglia et al. ................ 434/43
4,348,186 A * 9/1982 Harvey et al. ................ 434/44
4,439,157 A * 3/1984 Breglia et al. ................ 434/44
4,479,784 A * 10/1984 Mallinson et al. ............ 434/44

(List continued on next page.)

FOREIGN PATENT DOCUMENTS

| GB | 2259213 | 3/1993 |
| JP | 2-291787 | 3/1990 |
| JP | HEI 2291787 | 12/1990 |

OTHER PUBLICATIONS

I.E. Sutherland, Proc. of the Full Joint Computer Conference, vol. 33, pp. 757–764, 1968.*

NHK Tech. Institute, R&D, No. 15, pp. 69–75, Sep. 1991.*

Primary Examiner—Steven Saras
Assistant Examiner—Srilakshmi Kumar
(74) Attorney, Agent, or Firm—Morgan & Finnegan, LLP

(57) ABSTRACT

This invention relates to an image display apparatus having first image generating means for displaying first image information by a plurality of pixels emitting light, second image generating means for displaying second image information by a plurality of pixels emitting light, the second image information being part of the first image information, visual axis detecting means for detecting an observer's visual axis direction, optical means for combining a first image from the first image generating means and a second image from the second image generating means, moving the second image relative to the first image in conformity with an output signal from the visual axis detecting means and turning it to the observer's pupil, the marginal portion of the second image being made substantially coincident with the boundary between the pixels of the first image when the images are combined, and image display changing means for changing the first image information and the second image information on the basis of the output signal of the visual axis detecting means.

35 Claims, 20 Drawing Sheets

U.S. PATENT DOCUMENTS

| | | | |
|---|---|---|---|
| 4,636,866 A | * | 1/1987 | Hattori .......................... 345/8 |
| 4,641,255 A | * | 2/1987 | Hohmann ................... 348/121 |
| 4,884,137 A | * | 11/1989 | Hanson et al. ............. 348/158 |
| 4,952,809 A | * | 8/1990 | McEwen ................... 348/164 |
| 4,984,179 A | * | 1/1991 | Waldern ........................ 345/8 |
| 5,005,083 A | * | 4/1991 | Grage et al. ................ 348/164 |
| 5,034,809 A | * | 7/1991 | Katoh ......................... 348/53 |
| 5,106,179 A | | 4/1992 | Kamaya et al. |
| 5,113,177 A | * | 5/1992 | Cohen ........................... 345/8 |
| 5,136,675 A | * | 8/1992 | Hodson ...................... 359/630 |
| 5,242,306 A | * | 9/1993 | Fisher .......................... 434/44 |
| 5,320,534 A | * | 6/1994 | Thomas ......................... 345/8 |
| 5,326,266 A | * | 7/1994 | Fisher et al. .................. 434/44 |
| 5,331,149 A | * | 7/1994 | Spitzer .......................... 345/7 |

* cited by examiner

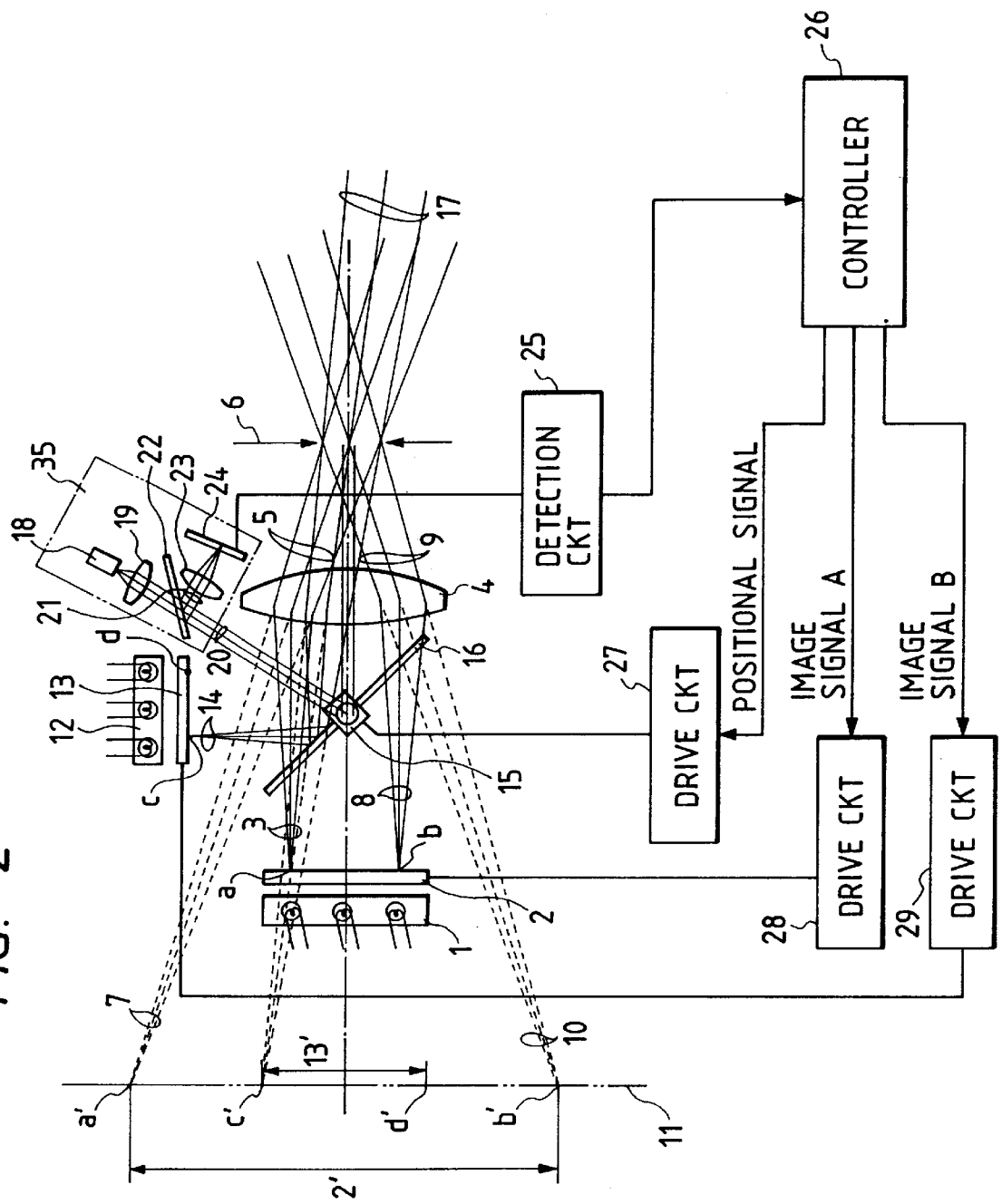

IMAGE DISPLAY APPARATUS AND IMAGE PHOTOGRAPHING APPARATUS THEREFOR

This is a continuation of application Ser. No. 08/217,986, filed on Mar. 25, 1994 now abandoned.

BACKGROUND OF THE INVENTION

1. Field of the Invention

This invention relates to an apparatus for displaying an image of a wide field angle, and particularly to an image display apparatus adapted to be mounted on the head portion or face of a person who observes an image and enable the person to observe the image information of a small display element such as a liquid crystal display element or a CRT therethrough while enlarging the image information as a virtual image.

2. Related Background Art

A display apparatus using a multilayer film reflecting surface or an optically transparent beam coupling element such as a hologram optical element to enable display information (image information) from a display element and image information such as a scene in the external world to be spatially superposed one upon the other in the same field of view and observed is generally called a head up display apparatus and is utilized in various fields. Also, a display apparatus in which the beam combiner is provided at a location relatively near to an observer's eyes in order to make the parts of the optical device of the head up display apparatus small and the optical device is mounted on a helmet is called a helmet mounted display apparatus (HMD apparatus), and its various applications to a display apparatus for the operation of an aircraft, a display apparatus for amusements such as games or for virtual reality, etc. have been proposed.

FIG. 1 of the accompanying drawings is a schematic view of an HMD apparatus as a display apparatus described in U.S. Pat. No. 4,028,725. Display lights emitted from CRTs 101 and 102 are made into substantially parallel beams of light by collimator lenses 103 and 108 and are reflected by mirrors 104 and 107, respectively, and the display lights from the two CRTs 101 and 102 are superposed one upon the other by dichroic mirrors 105 and 109. The display lights thus superposed one upon the other have their direction again changed by a mirror 106 and are enlarged through a lens 110, and are directed to an observer's pupil 114 by a half mirror 111. At this time, the CRT 101 displays a wide field image 113 and the CRT 102 displays a narrow field image 112. Also, the dichroic mirror 109 is installed so as to shield the vicinity of the center of the dichroic mirror 105 from light and therefore, the observer can observe the wide field image 113 displayed by the CRT 101 and the narrow field image 112 from the CRT 102 displayed near the center thereof while superposing these images upon a scene or the like behind the half mirror 111.

Also, in this example of the prior art, a so-called purkinje image provided by the light from a light source 115 of infrared rays being reflected by the observer's pupil 114 is detected by a detection unit 119 comprising a beam splitter 116 and photodiodes 117, 118, whereby the observer's visual axis direction is detected.

The output of this visual axis detecting means is inputted to the servo system (not shown) of the movable half mirror 111 and thus, the aforementioned two field images are always displayed forwardly in the observer's visual axis direction.

In the example of the conventional art shown in FIG. 1, the field angles of the wide field image and the narrow field image are 25° and 5°, respectively, and the narrow field image is displayed with a high resolution, whereby with the displayed image of the high resolution as the center of the field of view, the wide field image is always observed around it. In the above-described example of the conventional art, however, design is made such that the image formed by the wide field image and the narrow field image being superposed one upon the other is always presented at the central portion of the field of view by the half mirror 111 controlled by the signal from the visual axis detecting means, and this has led to a problem that even if the observer gazes at any point on the wide field image, the image is not visually recognized at the center of the field of view and the portion intended by the observer cannot be observed. Also, a field angle much wider than the field angle as in the above-described example of the prior art, e.g. 25°, is required of the display apparatus for virtual reality and for example, a display for displaying a field angle of 88° by one eye has been commercialized, but in these apparatuses, the resolution of the displayed image depends on the pixel density of the liquid crystal display element used, and this has led to a disadvantage that at present, the displayed image does not have a sufficient resolution.

SUMMARY OF THE INVENTION

It is the object of the present invention to provide an image display apparatus for enabling an observer to observe the image of a place the observer wants to seen in a wide field image by a highly fine image, and an image photographing apparatus therefor.

To achieve the above object, one form of the image display apparatus of the present invention is characterized by first image generating means for displaying first image information by a plurality of pixels emitting light, second image generating means for displaying second image information by a plurality of pixels emitting light, the second image information being part of the first image information, visual axis detecting means for detecting an observer's visual axis direction optical means for combining a first image from the first image generating means and a second image from the second image generating means, moving the second image relative to the first image in conformity with an output signal from the visual axis detecting means and turning it to the observer's pupil, the marginal portion of the second image being made substantially coincident with the boundary between the pixels of said first image when the images are combined and image display changing means for changing said first image information and the second image information on the basis of the output signal of the visual axis detecting means.

In a further preferred form, the size of the second image is integer times as great as the interval between the pixels (or the size of the pixel) of the first image when the images are combined.

In still a further preferred form, the first image information in an area wherein the first image and the second image are superposed one upon the other when the images are combined is the second image information.

In yet still a further preferred form, the area of the images superposed one upon the other is not displayed by the first image generating means.

In a further preferred form, the pixel density in the central portion of the second image is higher than the pixel density of the first image and the pixel density in the marginal portion of the second image is substantially the same as the pixel density of the first image when said images are combined.

In still a further preferred form, the luminance in the central portion of the second image is higher than the luminance of the first image and the luminance in the marginal portion of the second image is substantially the same as the luminance of the first image when the images are combined.

In yet still a further form, the first and second images are combined on an intermediate imaging plane through respective relay lenses, are enlarged as virtual images and are turned to the observer's pupil.

In a further preferred form, the relay lenses have different imaging magnifications.

Another form of the image display apparatus of the present invention is characterized in that the image display apparatus is provided correspondingly to each of the observer's left and right eyes.

In a further preferred form, the second image generating means corresponding to the left and right eyes display parallax image information corresponding to the respective eyes.

In still a further preferred form, the first image generating means is used in common.

Another form of the image display apparatus of the present invention is characterized by first image generating means for emitting light and displaying first image information second image generating means for emitting light and displaying second image information, the second image information being part of said first image information visual axis detecting means for detecting an observer's visual axis direction head portion position detecting means for detecting the position of the observer's head portion optical means for combining a first image from the first image generating means and a second image from the second image generating means, moving the second image relative to the first image in conformity with an output signal from the visual axis detecting means and turning it to the observer's pupil and image information changing means for changing the first image information and the second image information on the basis of the output signal of the visual axis detecting means and the output signal of the head portion position detecting means.

A further preferred form has an image memory having recorded therein the image all around a predetermined position, and inputs a part of said image memory to said first image generating means as the first image information in conformity with the output signal of the head portion position detecting means.

One form of the image photographing apparatus of the present invention is an image photographing apparatus for an image display apparatus for displaying, on the basis of output signals from visual axis detecting means for detecting the visual axis direction of an observer who observes a first image from first image generating means for displaying first image information and head portion position detecting means for detecting the position of the observer's head portion, a combined image of said first image and a second image from second image generating means for displaying second image information which is part of the first image information, characterized by first image pickup means for obtaining the first image information second image pickup means for obtaining the second image information means for controlling the photo-taking direction of the first image pickup means in conformity with the output signal from the head portion position detecting means and means for controlling the photo-taking direction of the second image pickup means in conformity with the output signal from the visual axis detecting means.

A further preferred form has means for transmitting the image information obtained from the first image pickup means to the image display apparatus while making the compression rate of the image information higher than that of the image information obtained from said second image pickup means.

In still a further preferred form, the image photographing apparatus is provided correspondingly to each of the observer's left and right eyes.

In yet still a further preferred form, said first image pickup means is used in common.

Some specific embodiments of the image display apparatus of the present invention will become apparent from the following detailed description thereof.

BRIEF DESCRIPTION OF THE DRAWINGS

FIG. 2 shows a first embodiment of the image display apparatus of the present invention.

DETAILED DESCRIPTION OF THE PREFERRED EMBODIMENTS

Figure 1:
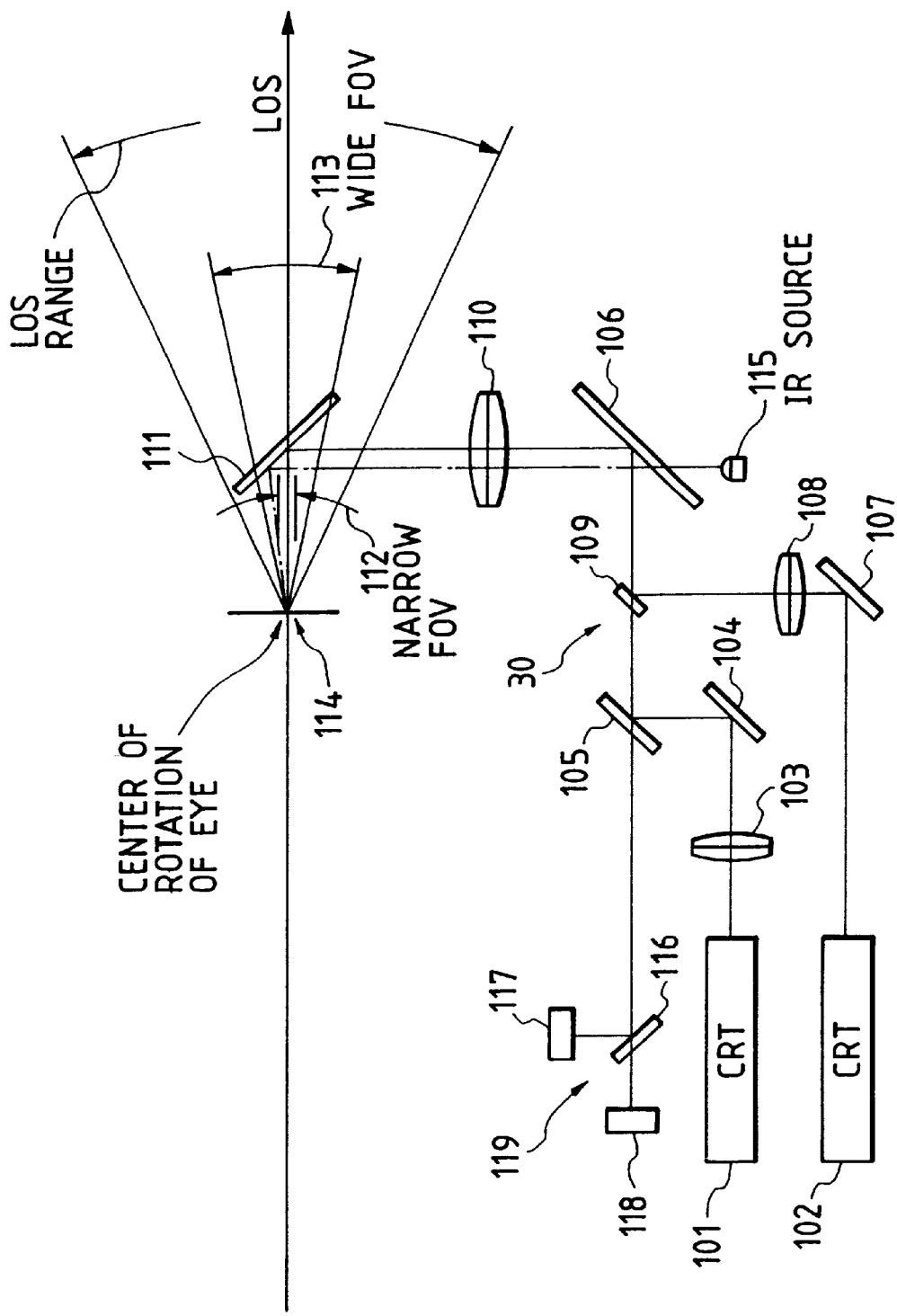
FIG. 1 shows an example of the image display apparatus according to the conventional art.

FIG. 2 is a schematic diagram showing a first embodiment of the image display apparatus of the present invention.

Light from a back light source 1 such as a fluorescent lamp is modulated by an image display element 2 such as a liquid crystal display element, and for example, a beam of light 3 emitted from a point a is displayed. This beam of light 3 passes through a half mirror 16, is converted into a beam of light 5 by a lens 4 and enters an observer's pupil 6. At this time, the power of the lens 4 and an optical device are set to suitable values, whereby the observer observes the beam of light 5 as a beam of light 7 emerging from a point a'. Likewise, a beam of light 8 from a point b on the image display element 2 is converted into a beam of light 9 by the lens 4, and the observer observes the beam of light 9 as a beam of light 10 emerging from a point b'.

Further, light from a back light source 12 is modulated by an image display element 13 such as a liquid crystal display element, and for example, a beam of light 14 emitted from a point c is displayed. This beam of light 14 is reflected by a half mirror 16 having drive means 15 movable on two axes, and enters the lens 4 and becomes a beam of light 17, which enters the observer's pupil 6. Accordingly, the observer observes the beam of light 17 as a beam of light emerging from a point c'. Likewise, a point d on the image display element is observed as a point d' on a virtual image plane 11.

As described above, the observer can observe while superposing the image information of the image display element as a virtual image 2' and the image information of the image display element 13 as a virtual image 13' one upon the other on the imaging position 11 of the virtual image and enlarging the two images.

These two virtual images 2' and 13' form a combined image in which the different image information 13' is superposed upon a cirtain portion on the image information 2' as the background, and the image information 13' is displayed at any location on the image information 2' by the half mirror 16 being rotatively controlled on two axes by the drive means 15 controlled by a positional signal from a controller 26.

The displayed position of the image information 13' will now be described. The image display apparatus according to the present invention has a visual axis direction detecting unit 35.

As the visual axis detecting method, use can be made of one of conventional methods such as the search coil method, the corneal reflection method and the limbus tracking method, but the search coil method requires the mounting of a strong film contact lens (larger than ordinary contact lenses) having a coil wound therein and is unsuitable for practical use, and the limbus tracking method is a method of measuring by detecting the difference in the reflectance of illumination light illuminating the vicinity of the boundary between the white (sclera) and the iris (cornea) of the eye between the respective portions, and has the advantage of being capable of constructing the system of an infrared light source and two photodetector elements, but suffers from a problem that measurement in the vertical direction is difficult.

Therefore, the present embodiment adopts a detecting method using the corneal reflection method which is simplest in construction and which has sufficient accuracy.

In FIG. 2, the reference numeral 18 designates a light source such as a light emitting diode which emits invisible infrared light to the observer. The light source 18 is disposed on the focal plane of a light projecting lens 19.

The infrared light emitted from the light source 18 is made into a parallel beam of light 20 by the light projecting lens 19, passes through a half mirror, is reflected by the half mirror 16, and enters and illuminates the observer's pupil 6 through the lens 4. At this time, a corneal reflection image based on part of the infrared light reflected by the surface of the cornea (not shown) of the eyeball again returns along the aforedescribed optical path, is reflected by the half mirror 22 and becomes a beam of light 21, which is condensed by a light receiving lens 23 and forms a corneal reflection image on an image sensor 24. Also, beams of reflected light from the two end portions of the iris (not shown) likewise form an image on the image sensor 24 by the light receiving lens 23.

These unique points (the corneal reflection image and the end portions of the iris) are detected and subjected to a suitable calculation process, whereby the angle of rotation of the optical axis of the eyeball can be found. For example, by $$\beta \cdot L \cdot \sin \theta = (Za+Zb)/2 - Zd,$$

the angle of rotation e of the optical axis of the eyeball can be found. In the above expression, $\beta$ is the imaging magnification of each unique point onto the image sensor 24, L is the distance from the center of curvature of the cornea to the iris, and Za, Zb and Zd are the positions of the two end portions of the iris and the cornea reflection image, respectively, on the image sensor 24.

A visual axis detection signal from the visual axis direction detecting unit 35 constructed on the basis of the principle as described above is subjected to a suitable calculation process by a detection circuit 25, and a visual axis direction output signal is inputted to the controller 26.

This visual axis direction signal is inputted as the positional signal of the virtual image 13' to a drive circuit 27, and the inclination of the half mirror 16 is controlled by the drive means 15 rotatable in the directions of two axes (horizontal and vertical directions), and the virtual image 13' is displayed always in coincidence with the visual axis direction. If the thickness of an optically transparent member constituting the half mirror 16 is great, the displayed position of the image 2' will be slightly moved by the rotation of this half mirror 16 and therefore, it is desirable that the thickness of the half mirror 16 be as small as possible.

In the present embodiment, in order to prevent the beam of light from the back light source 12 or 1 from entering the visual axis direction detecting unit 35 as an unnecessary beam of light, an optical filter absorbing or reflecting visible light and transmitting only infrared light therethrough can be provided at a suitable location between the half mirror 22 of the visual axis direction detecting unit 35 and the half mirror 16 to thereby prevent the incidence of unnecessary light onto the image sensor 24 and enhance the accuracy of the detection signal.

Also, in the present embodiment, there has been shown only a case where only the visual axis direction detecting unit is provided to thereby control the position at which the virtual image 13' is displayed, but it is also possible to control the displayed position of the virtual image 13' by the positional signal of the observer's head portion and the visual axis detection signal, by the use of a suitable head portion position detecting method (which will be described later in detail), for example, a method of forming a magnetic field around the head portion and providing a magnetic sensor on the head portion.

Particularly, in the detection of the visual axis direction using the corneal reflection method, the 1 mm movement of the reflected image corresponds to 10 degrees of eyeball motion and therefore, if the position of the head moves by 1 mm in parallel (without rotating), a detection error of 10 degrees will occur. Therefore, it is desired that the signal of the head portion position detecting means be used to cancel it. As a matter of course, use can also be made of a conventional method utilizing the reflected image from the rear surface of the crystalline lens (called the fourth Purkinje image) to cancel the movement of the head. As will be described later, however, the present invention is characterized in that the image information 2' as the background is varied by the signal from the head portion position detecting means, and the head portion position is always detected from this character and therefore, a visual axis detecting method using a simple corneal reflection method using the first Purkinje image will suffice.

As described above, the image display apparatus according to the present invention has means for relatively moving the image information from the two image display elements 2 and 13 on the imaged position 11 of the virtual image, whereby different image information 13' can be displayed at any position on the image information 2' as the background.

At this time, the image information 13' has its position controlled by the detection signal from the visual axis direction detecting unit 35 and is displayed always in coincidence with the visual axis direction.

The image information 13' is part of the image information 2' and by making its image quality highly fine, the observer can highly finely observe the image information 13' in the portion of the image information 2' of a wide field angle the observer wants to see (the vicinity of the gaze point).

Also, the image information 2' as the background is varied by the signal from the head portion position detecting means and further, the gaze point on the image information 2' is extracted by the signal from the visual axis direction detecting unit and the display information of the image display element 13 is changed, whereby the observer can move his or her head and eyes to thereby observe image information which is very wide, e.g. ranges over 360 degrees around the observer as if all of the image information was displayed highly finely. Of course, the order of the rewriting of the above-described two images is sometimes converse as when the gazing point has moved and thereafter the head turns in that direction.

Generally, in equilibrium with yield, an LCD having a small pixel size and a large display area is difficult and expensive to manufacture. In the present embodiment, the LCD 2 is an LCD having a large display area and a large pixel size, and the LCD 13 is an LCD having a small display area and a small pixel size, and when the display area of the LCD 2 is S2 and the display area of the LCD 13 is S13, the screen size of the LCD 2 and the screen size of the LCD 13 are approximately $\sqrt{S2}:\sqrt{S13}$. Also, the LCD 2 and the LCD 13 are optically at the same distance relative to the lens 4, and the ratio between the sizes of images 2' and 13' enlargedly projected onto the virtual image plane 11 are also approximately $\sqrt{S2}:\sqrt{S13}$. Accordingly, the observer can visually recognize the image of the LCD 2 as a large image 2' of coarse pixels on the virtual image plane and the image of the LCD 13 as a small image 13' of fine pixels on the virtual image plane while superposing the two images one upon the other.

Description will now be made of image signals sent to the LCD 2 and LCD 13 and an image visually recognized by the observer.

FIG. 3 illustrates the images visually recognized by the observer in the present embodiment. FIG. 3A shows the original image information, and FIG. 3B shows image information of the original image information of FIG. 3A which is displayed by the LCD 13. When the cutting-out of the image is to be effected by the head portion position and direction detecting means, the image information of FIG. 3A becomes the image information of the widely displaying image area 2'.

Figure 3A:
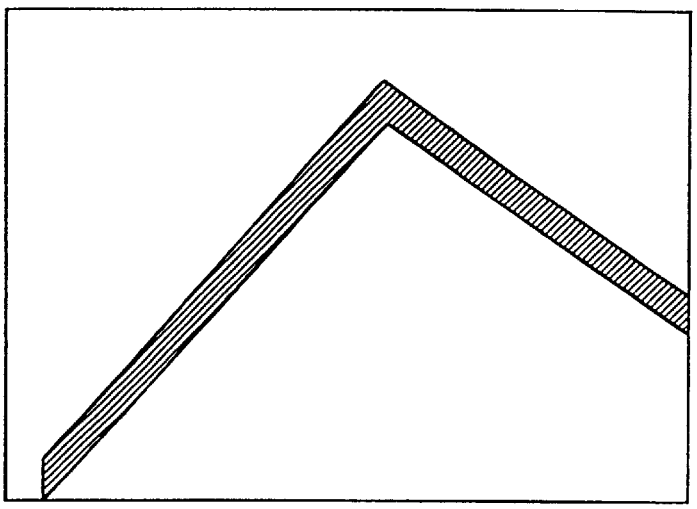
FIGS. 3A, 3B, 3C and 3D are views for illustrating images visually recognized by an observer.
Figure 3B:

The controller 26 shown in FIG. 2 receives the visual axis position signal from the detection circuit 25 and cuts out of the original image information FIG. 3A, an image of a size corresponding to the display area of the LCD 13 when the visual axis position from within the original image information is the center and is imaged on the virtual image plane 11, and makes it into partial image information FIG. 3A. The controller 26 shown in FIG. 2 sends the original image information FIG. 3A to a drive circuit 28 and sends the image information FIG. 3B to a drive circuit 29, and the drive circuits 28 and 29 use the sampling or the like of image data by a method similar to that conventionally used for the driving of LCD to display images on the LCD 2 and LCD 13, respectively.

Figure 3D:
Figure 3C:
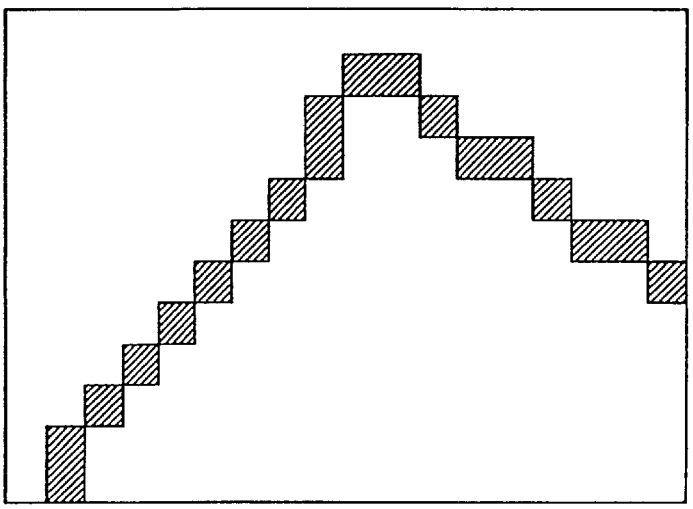
Figure 4:
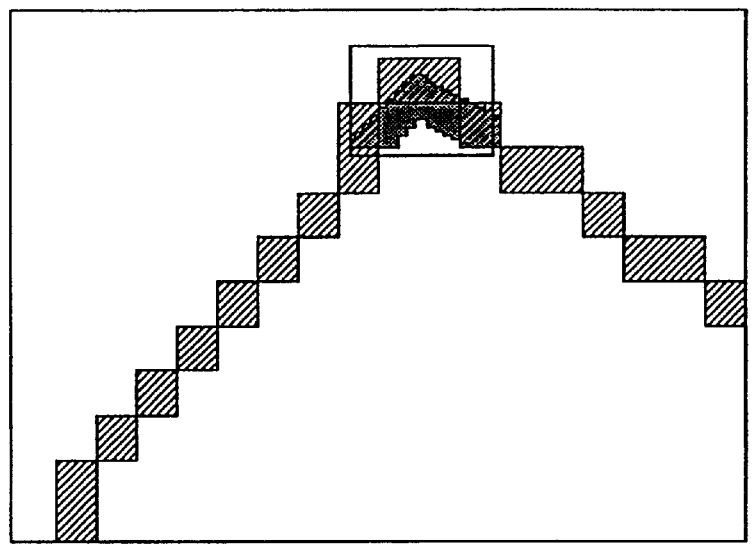
FIG. 4 is a view showing an image visually recognized by the observer.

FIG. 3C shows the image actually displayed on the LCD 2 shown in FIG. 2, and FIG. 3D shows the image actually displayed on the LCD 13, and the LCD 2 of FIG. 2 has large pixels and a large display area and therefore, FIG. 3C is a coarse image having a great angle of display field, and the LCD 13 of FIG. 1 has fine pixels and a small display area and therefore, FIG. 3D, is a highly fine image having a small angle of display field. The drive circuit 27 of FIG. 2 effects the two-axis rotation of the half mirror 16 in accordance with the aforementioned visual axis position signal, and gives the half mirror driving system 15 such a drive signal that the center of the virtual image of the LCD 13 by the lens 4 coincides with the observer's visual axis. Thus, the observer visually recognizes on the virtual image plane 11 the image of FIG. 3C displayed on the LCD 2 and the image of FIG. 3D displayed on the LCD 13 while superposing these two images one upon the other, and the center of the image FIG. 3D displayed on the LCD 13 coincides with the observer's visual axis. FIG. 4 shows the image visually recognized by the observer in the present embodiment, and the center of the virtual image of the image displayed on the LCD 13 by the lens 4 is coincident with the observer's visual axis. Moreover, the images displayed on the LCD 2 and LCD 13 are superposed one upon the other by the above-described processing and are visually recognized by the observer, and a highly fine image can be observed near the gazing point.

If at this time, the drive circuit 29 and the illumination light source 12 are set so that the image to be displayed on the LCD 13 may be displayed with high luminance, the visual recognizability of the highly fine image near the gazing point could be improved. Further, if such a measure that the displayed image on the LCD 13 gradually becomes lower in luminance from the center toward the marginal portion thereof is adopted, the luminance difference in the boundary portion between the narrow image 13' and wide image 2' projected onto the virtual image plane 11 could be made inconspicuous. Specifically, the drive circuit 29 can be set such that the image signal of the image displayed on the LCD 13 becomes lower in luminance from the center toward the marginal portion, or an optical filter such as an ND filter which becomes higher in light absorption rate from the central portion toward the marginal portion can be installed in the LCD 13.

As a basic method of solving the difficulty for the image to be seen in the boundary of the superposed portion of the images, there is a method which will herein after be described, besides the above-described method. FIGS. 5A to 5D, 6A and 6B are views for illustrating the processing of the images in an embodiment of the present invention wherein overlap is prevented. However, in FIGS. 5C and 5D and FIG. 6B, for illustration, pixels are depicted more coarsely than in the actual embodiment.

Figure 5A:
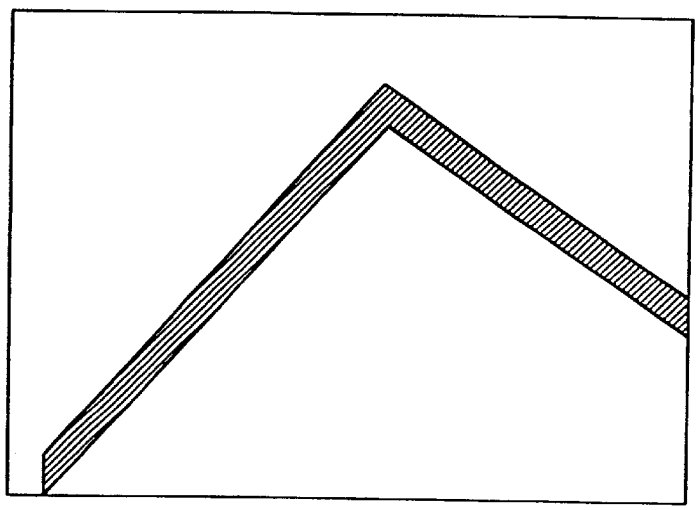
FIGS. 5A, 5B, 5C and 5D are views for illustrating image processing.
Figure 5B:
Figure 5D:
Figure 5C:
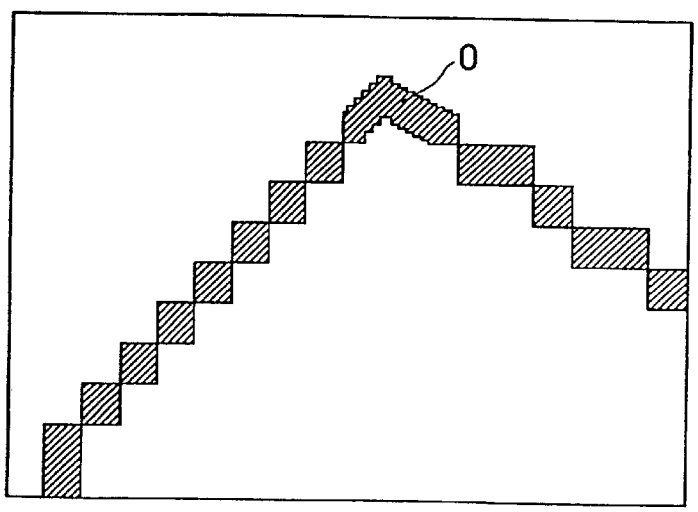
Figure 6A:
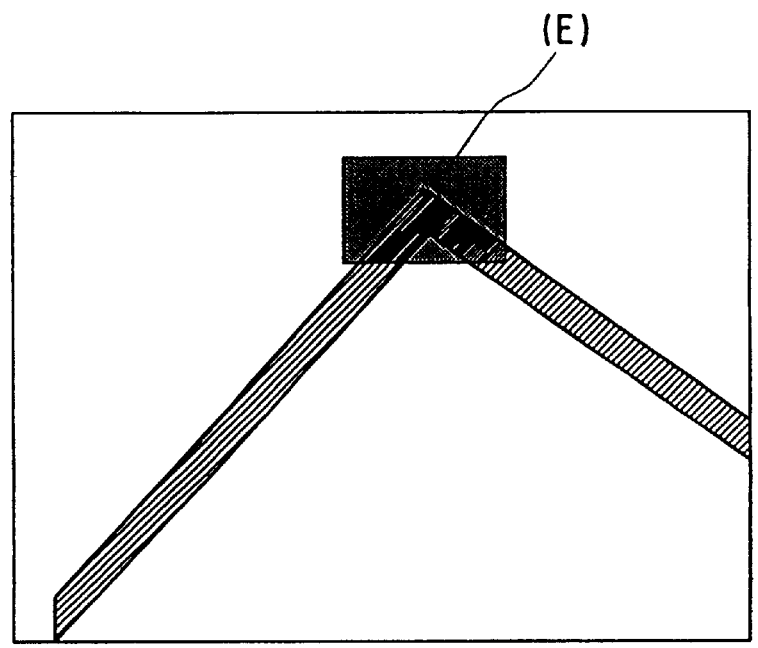
FIGS. 6A and 6B are views for illustrating image processing.

FIG. 5A shows the original image information which is about to be displayed, FIG. 6A shows the image information sent to the LCD 2, FIG. 5B shows the image information sent to the LCD 13, and FIG. 5C shows the combined image visually recognized by the observer. In FIG. 6A, a black-colored portion (E) is a portion in which the LCD 2 displays perfectly black (does not display any image). The original image information FIG. 5A is sent to the controller 26 of FIG. 2 by a signal line, not shown. The controller 26 receives the visual axis position signal from the detection circuit 25, divides the original image information FIG. 5A into the center as the visual axis position in the original image information, the image FIG. 5B to be displayed on the LCD 13, and the image information FIG. 6A of said image in which of the original image information FIG. 5A, the portion corresponding to the image information FIG. 5B is a black signal (luminance signal 0), and sends them to the drive circuits 29 and 28 as the image signals B and A of FIG. 2, respectively.

Figure 6B:
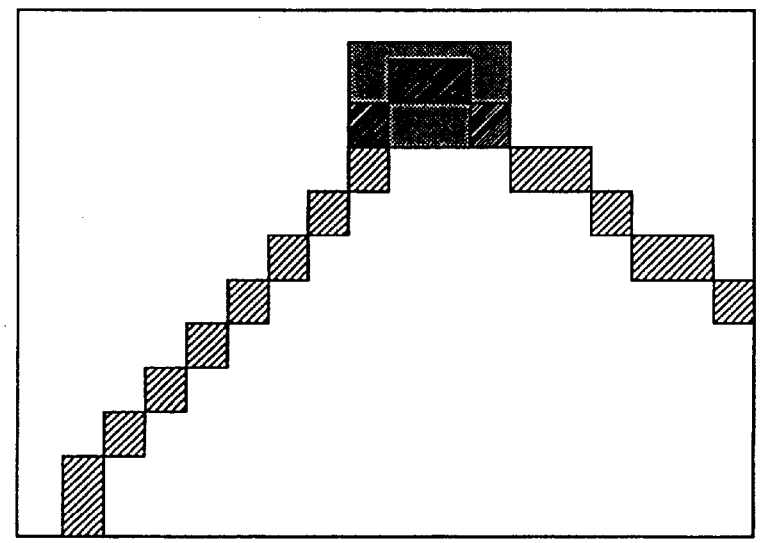

The drive circuits 29 and 28 effect the sampling or the like of image data by a method conventionally used for the driving of LCDs, and send the image signals B and A to the LCD 13 and LCD 2, respectively, to thereby make the LCD 13 and LCD 2 display the images. As previously described, FIG. 6B shows the image actually displayed on the LCD 2, and since the LCD 2 has large pixels and a large display area, this image becomes a coarse image great in the angle of display field. FIG. 5D shows the image actually displayed on the LCD 13, and since the pixels of the LCD 13 are small and the display area thereof is small, this image becomes a highly fine image small in the angle of display field.

The image signal A sent from the controller 26 to the drive circuit 28 can also be sent as an image signal compressed by the controller 26.

In the present embodiment, by the fact that as previously described, the LCD 2 and the LCD 13 are disposed optically at the same position relative to the lens 4 of FIG. 2 and by the driving of the half mirror 16, the image visually recognized by the observer becomes the image FIG. 5C comprising FIG. 6B and FIG. 5D superposed one upon the other. However, the center of the observer's visual axis is the point 0 of FIG. 5B, and this is substantially coincident with the center of the image FIG. 5D actually displayed on the LCD 13 of FIG. 2.

Figure 7:
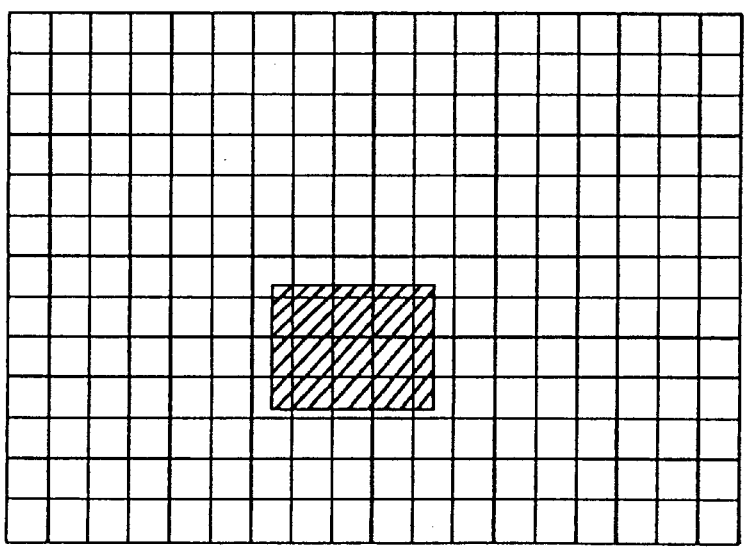
FIG. 7 is a view for illustrating the pixel arrangement of a combined image.

The center of the visual axis detected in the embodiment of FIG. 2 is one detected independently of the size and arrangement of the pixels of the LCD 2. FIG. 7 is a view for illustrating the size and arrangement of the pixels of the LCD 2 and the relation of the displayed position of the image displayed on the LCD 13 to the observer.

In FIG. 7, in contrast with the pixels of the LCD 2 of FIG. 2 represented in a lattice-like form, the image portion displayed on the LCD 13 is indicated by hatching.

In the aforedescribed embodiment, the center of the visual axis is determined with the size and arrangement of the pixels of the LCD 2 of FIG. 2 not taken into account and therefore, the boundary when the image information FIG. 5B to be displayed on the LCD 13 and the image information FIG. 5A displayed on the LCD 2 are superposed one upon the other does not always coincide with the actual boundary between the pixels of the LCD 2, but generally overlap with some of the pixels of the LCD 2. Accordingly, when the sampling point of the drive circuit 28 rests on the black signal in the image information FIG. 6A, i.e., the portion in which the luminance signal is 0, the black portion displayed on the LCD 2 (the portion which displays no image) becomes larger than the portion overlapping with the LCD 13, and an unnecessary black line (a non-display portion) appears in the display boundary portion between the LCD 2 and LCD 13 of the image visually recognized by the observer. To prevent this, the vertical and horizontal lengths of the display portion of the LCD 13 can be set to integer times as great as the vertical and horizontal length of a pixel of the LCD 2 and the size of the display portion of the LCD 2 can be set to integer times as great as the vertical and horizontal dimensions of the LCD 13, and the visual axis position signal of the visual axis sensor can be converted into a discrete value based on the pixel arrangement of the LCD 2, in the controller 26.

Figure 8:
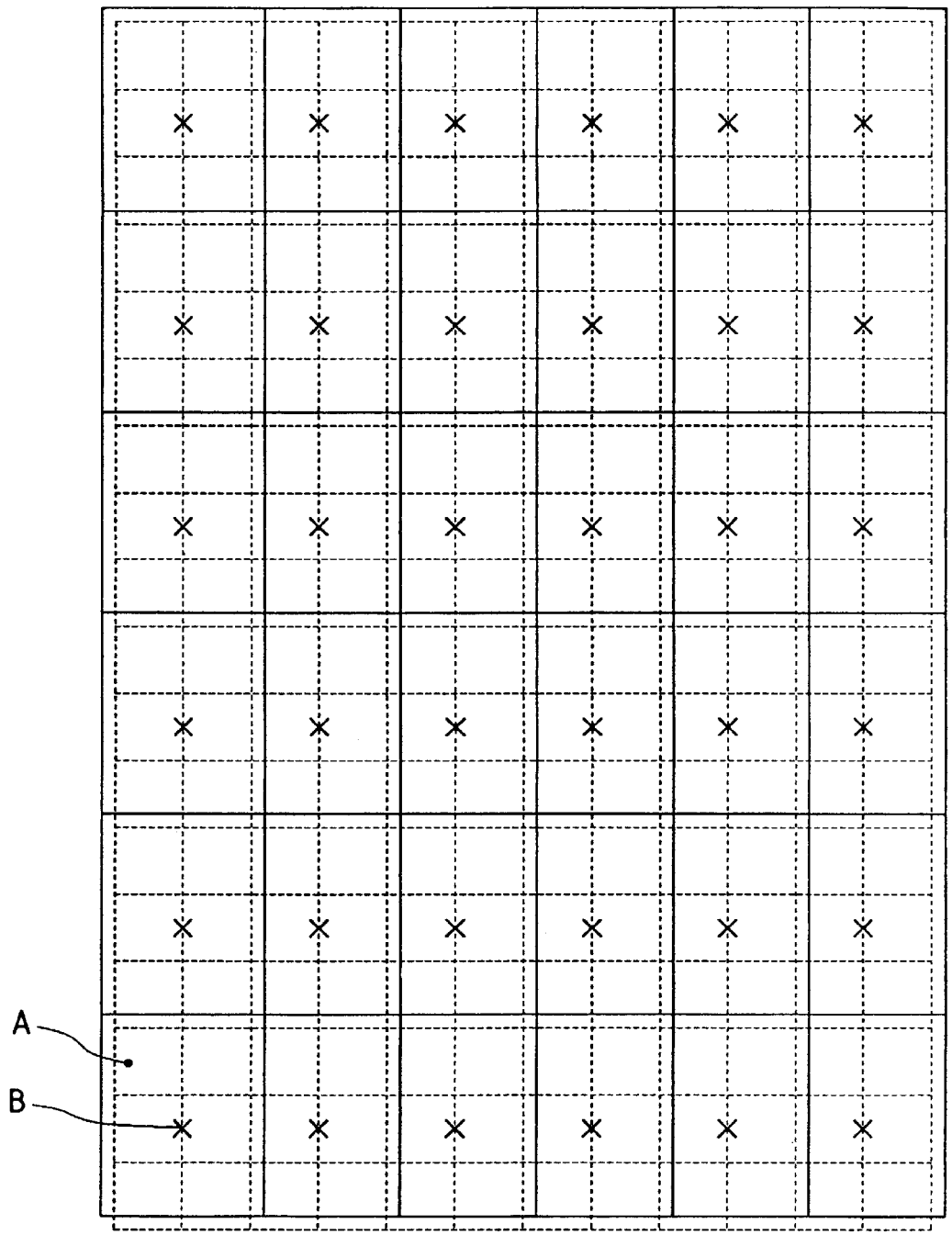
FIG. 8 is a view for illustrating the pixel arrangement of the combined image.

FIG. 8 shows a case where, for example, the vertical and horizontal lengths of the display portion of the LCD 13 are set to two times and three times, respectively, as great as a pixel of the LCD 2 and the vertical and horizontal dimensions of the display portion of the LCD 2 are set to six times each as great as the vertical and horizontal dimensions of the display portion of the LCD 13. When the output of the visual axis sensor comes into one of areas partitioned at the size of the image of the LCD 13 on the virtual image plane 11, relative to the images of the pixel arrangement of the LCD 2 (broken-line lattices) on the virtual image plane 11 and area groups (solid-line lattices) partitioned at the size of the image of the LCD 13 on the virtual image plane 11 (for example, the point A), it is judged that the observer is looking at the central point B in that area, and as previously described, the original image information FIG. 5A can be decomposed into the image information FIG. 6A and the image information FIG. 5C. The digitizing of the above-described visual axis output is effected by the use of a CPU installed in the controller 26 of FIG. 2 and an ROM having the positional data of the above-mentioned area groups recorded therein.

At this time, by properly setting the size of the pixels of the image sensor 24 of the visual axis detecting unit 35 and the imaging magnification of the unique point of the human eye onto the image sensor 24 in conformity with the size at which a pixel of the LCD 2 is visually recognized by the observer, the calculation process can be simplified. In the present invention, the angle of rotation θ of the optical axis of the eyeball is found from $$\beta \cdot L \cdot \sin \theta (Za+Zb)/2 - Zd$$

as previously described.

β and the size of the pixels of the image sensor 24 can be set so that the values of Za, Zb and Zd for the angle of rotation of the optical axis of the eyeball corresponding to the size at which a pixel is visually recognized by the observer may be integer times as great as the pixels of the image sensor 24.

Numerous methods of visual axis detection have been proposed besides the method described in the present invention, but for any of those methods, the calculation process can be simplified by a similar method. Also, where as described above, the image by the LCD 13 for the gaze area is moved with the pixel pitch of the image by the LCD 2 for wide area display as the unit, the driving of the half mirror 22 may be discrete driving corresponding to a pixel of the image by the LCD 2, and can be effected by the use, for example, of a stepping motor or the like.

The above-mentioned ratios between the vertical and horizontal lengths of a pixel of the LCD 2 and the vertical and horizontal lengths of the display portion of the LCD 13 and the ratios between the vertical and horizontal lengths of the display portion of the LCD 2 and the vertical and horizontal lengths of the display portion of the LCD 13 are values set for the simplicity of description and can actually be set to values conforming to the purpose of use. Also, in the present embodiment, there is a case where in the boundary between the displayed image on the LCD 2 and the displayed image on the LCD 13, there is a discontinuous variation in the pixel size and it is conspicuous. In order to prevent this, the displayed image is made coarser from the center toward the marginal portion of the displayed image on the LCD 13, whereby the variation in the pixel size in the boundary portion can be made inconspicuous.

Figure 9A:
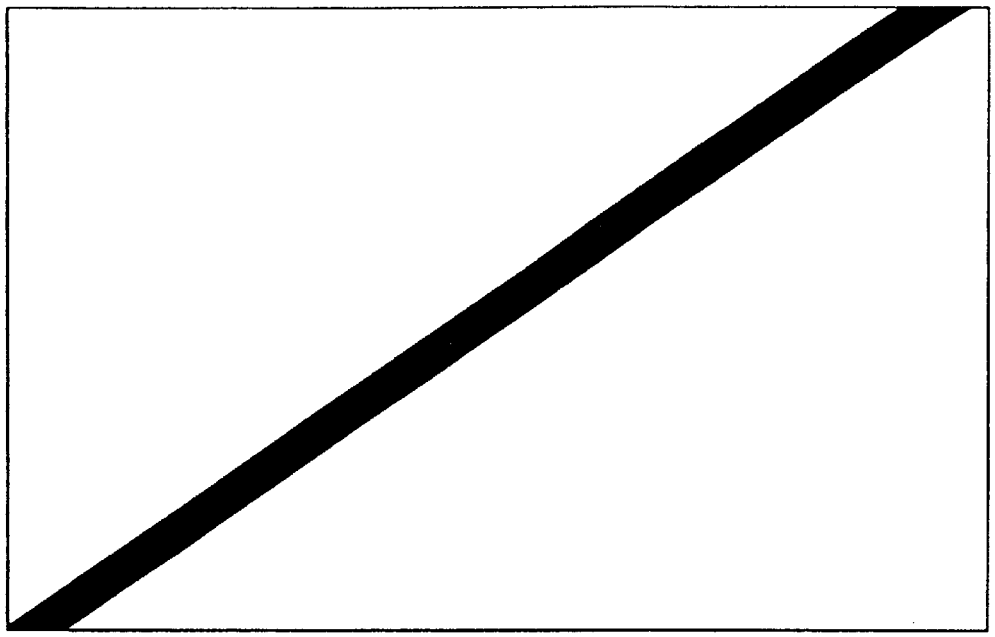
FIGS. 9A and 9B are views for illustrating the pixel arrangement of the combined image.
Figure 9B:
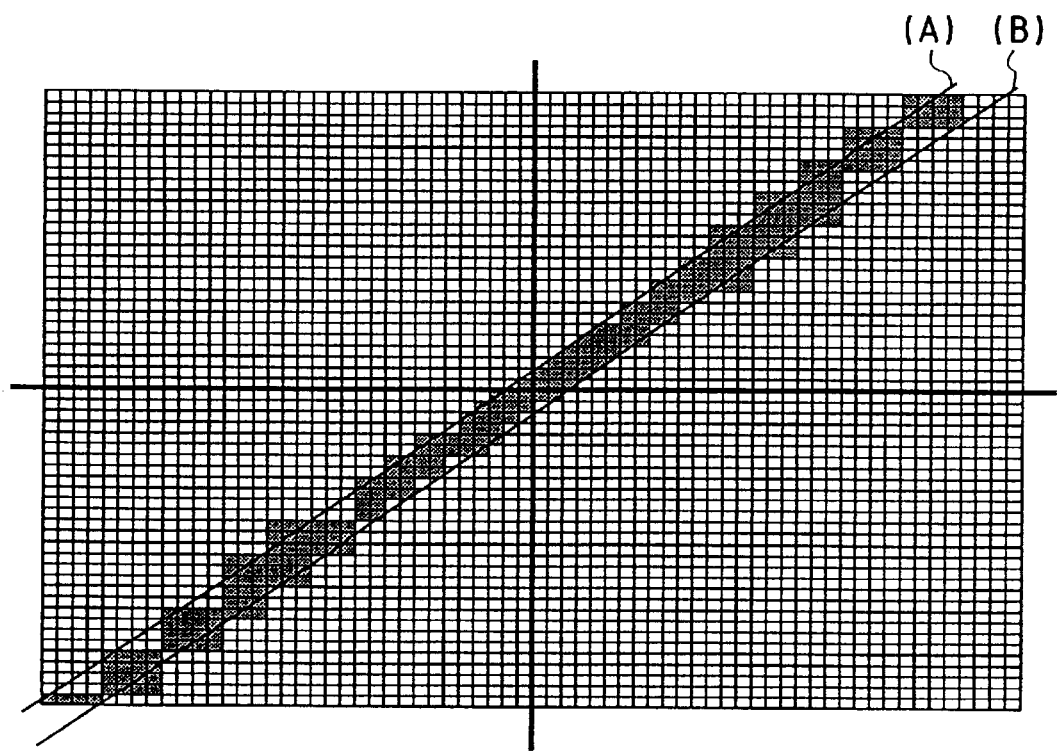

FIGS. 9A and 9B illustrate the above-described processing. FIG. 9A shows an image to be displayed on the LCD 13 of FIG. 2, and FIG. 9B shows an image subjected to the above-described processing and made coarser toward the marginal portion thereof and actually displayed on the LCD 13. In FIG. 9B, thin solid-line lattices indicate the pixels of the LCD 13, thick solid lines indicate the center lines for indicating the center of the LCD 13, and two thin slant solid lines (A) and (B) indicate the boundary of the image represented by the thick line in FIG. 9A. As shown in FIG. 9B, the display of the displayed image is made coarser from the center toward the marginal portion of the LCD 13, and in the boundary between the displayed images on the LCD 13 and the LCD 2 of FIG. 2, the coarseness of the displayed image on the LCD 13 is made substantially equal to the coarseness determined by the pixel size of the LCD 2, whereby the feeling of physical disorder by a sudden variation in the pixel size can be mitigated. To carry out this processing, the sampling in the drive circuit 29 of FIG. 2 can be effected so as to be coarse in the marginal portion of the LCD 13 of FIG. 2 and fine in the central portion thereof.

For the smoothing of the pixels, as will hereinafter be described, use may be made of a method whereby the image signal displayed on the pixels of the gazing point portion is made into a signal taking the weighted mean of the image signal roughly sampled correspondingly to the size of the pixels of the widely displaying LCD 2 and the original image signal and display is effected with the weight of the image signal which has been sampled more roughly toward the marginal portion of the gazing point portion image being made great.

Figure 10:
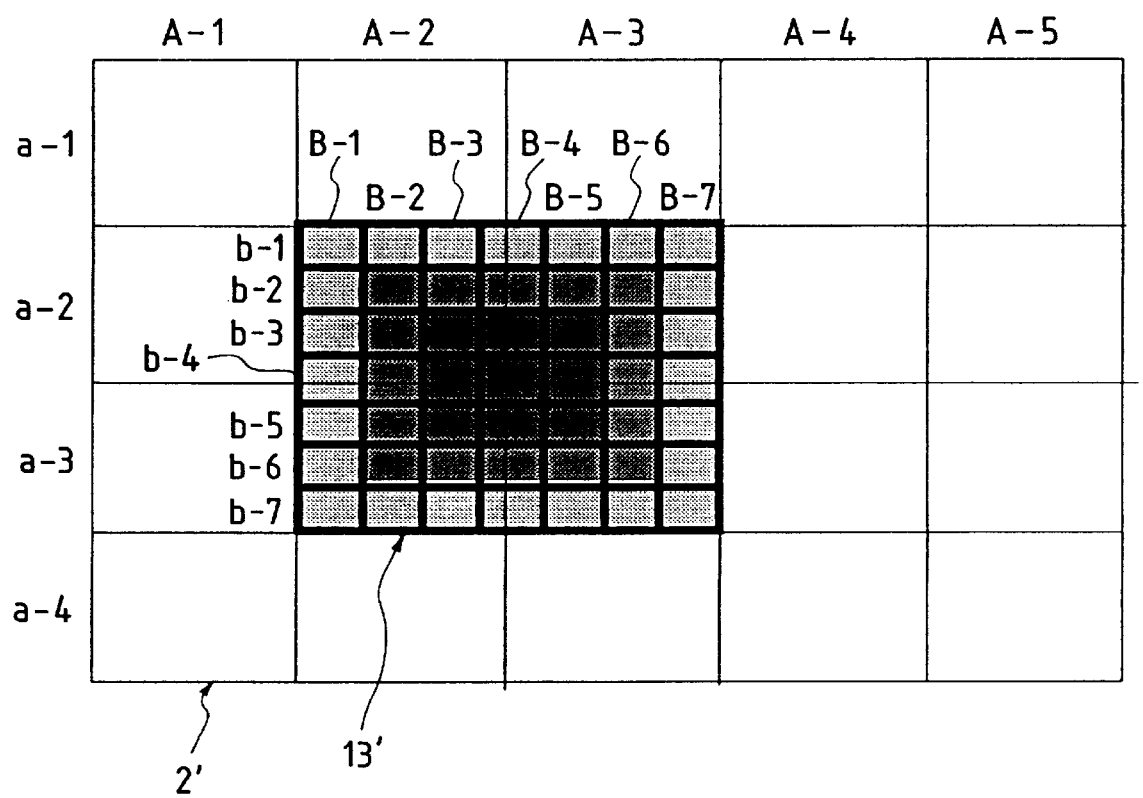
FIG. 10 is a view for illustrating a smoothing method.

FIG. 10 is a conceptual view for illustrating the smoothing method.

The reference numeral 21 designates an image area widely displayed by the LCD 2, and this image area is divided into pixels (a-i, A-j) correspondingly to the pixels of the LCD 2 (i=1 . . . 4, j=1 . . . 5).

The reference numeral 13' denotes the image area of the gazing point portion by the LCD 13, and this image area is divided into pixels (b-i, B-j) correspondingly to the pixels of the LCD 13 (i=1 . . . 7, j=1 . . . 7).

Image signals corresponding to the central nine pixels {(b-3, B-3), (b-3, B-4), (b-3, B-5,), (b-2, B-3), (b-3, B-4), (b-3, B-5), (b-4, B-3), (b-4, B-4), (b-4, B-5)} in the image area of the gaze portion are the original image signal as it is intactly flowed, and a signal having taken the mean at the weight of 1 to 1 of the original image signal and the roughly sampled image signal is flowed to sixteen pixels (b-2, B-2), (b-2, B3), (b-2, B-4), (b-2, B-5), (b-2, B-6), (b-3, B-2), (b-3, B-6), (b-4, B-2), (b-5, B-2), (b-5, B-6), (b-6, B-2), (b-6, B-3), (b-6, B-4), (b-6, B-5), (b-6, B-6)} in the image area of the gaze portion which surround the center, and a signal having taken the mean at the weight of 1 to 2 of the original image signal and the roughly sampled image signal is flowed to the most marginal twenty-four pixels {(b-1, B-1), (b-1, B-2), (b-1, B-3), (b-1, B-4), (b-1, B-5), (b-1, B-6), (b-1, B-7), (b-2, B-1), (b-2, B-7), (b-3, B-1), (b-3, B-7), (b-3, B-1), (b-3, B-7), (b-4, B-1), (b-4, B-7), (b-5, B-1), (b-5, B-7), (b-6, B-1), (b-6, B-7), (b-7, B-1), (b-7, B-2), (b-7, B-3), (b-7, B-4), (b-7, B-5), (b-7, B-6), (b-7, B-7)} in the image area of the gazing point portion.

The roughly sampled image signal is an image signal displayed on that pixel of the widely displaying image area 2' on which rests a certain point, e.g. the left upper point in the pixels of the gazing point portion 13' (for example, (a-2, A-2) corresponds to (b-4, B-2)). Where the left upper point in the pixels of the gaze portion rests on the boundary between the pixels of the widely displaying area 2', the weighted mean with the image signal displayed on that pixel of the widely displaying image area 2' on which rests the right lower point in the pixels of the gazing point portion.

Figure 11:
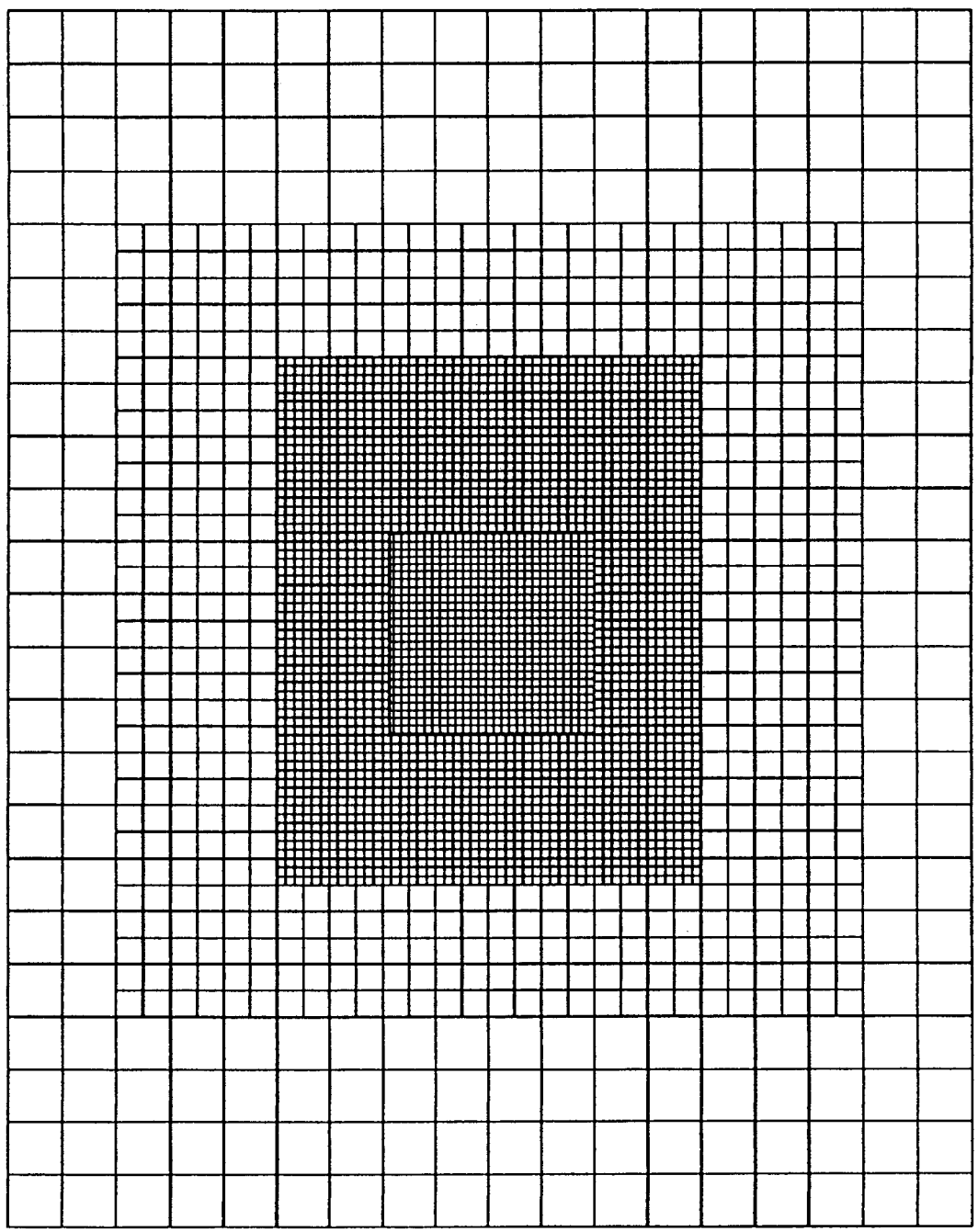
FIG. 11 is a view for illustrating the pixel arrangement of the combined image.

Also, design may be made such that the pixel size of the LCD 13 is actually small in the central portion and large in the marginal portion and gradually becomes larger from the center toward the marginal portion. FIG. 11 shows the sizes and arrangement of the pixels of the above-described LCD 13. The size of the pixels in the most marginal portion is set to substantially the same as the size of the pixels of the LCD 2 of FIG. 2.

In the first embodiment, as previously described, the image information capable of being displayed highly finely over the whole display area is divided into the image information of a small field angle portion (the image displayed on the LCD 13 of FIG. 2) displayed highly finely and the image information of a great field angle portion (the image displayed on the LCD 2 of FIG. 2) displayed coarsely, and in the coarsely displayed image portion, the high frequency component of the image signal has been discarded by the sampling circuit. In such a method, a high specification is required of a TV camera or a computer for making the original image or recording means for recording image data, or much time and cost are required for making image information.

Figure 12:
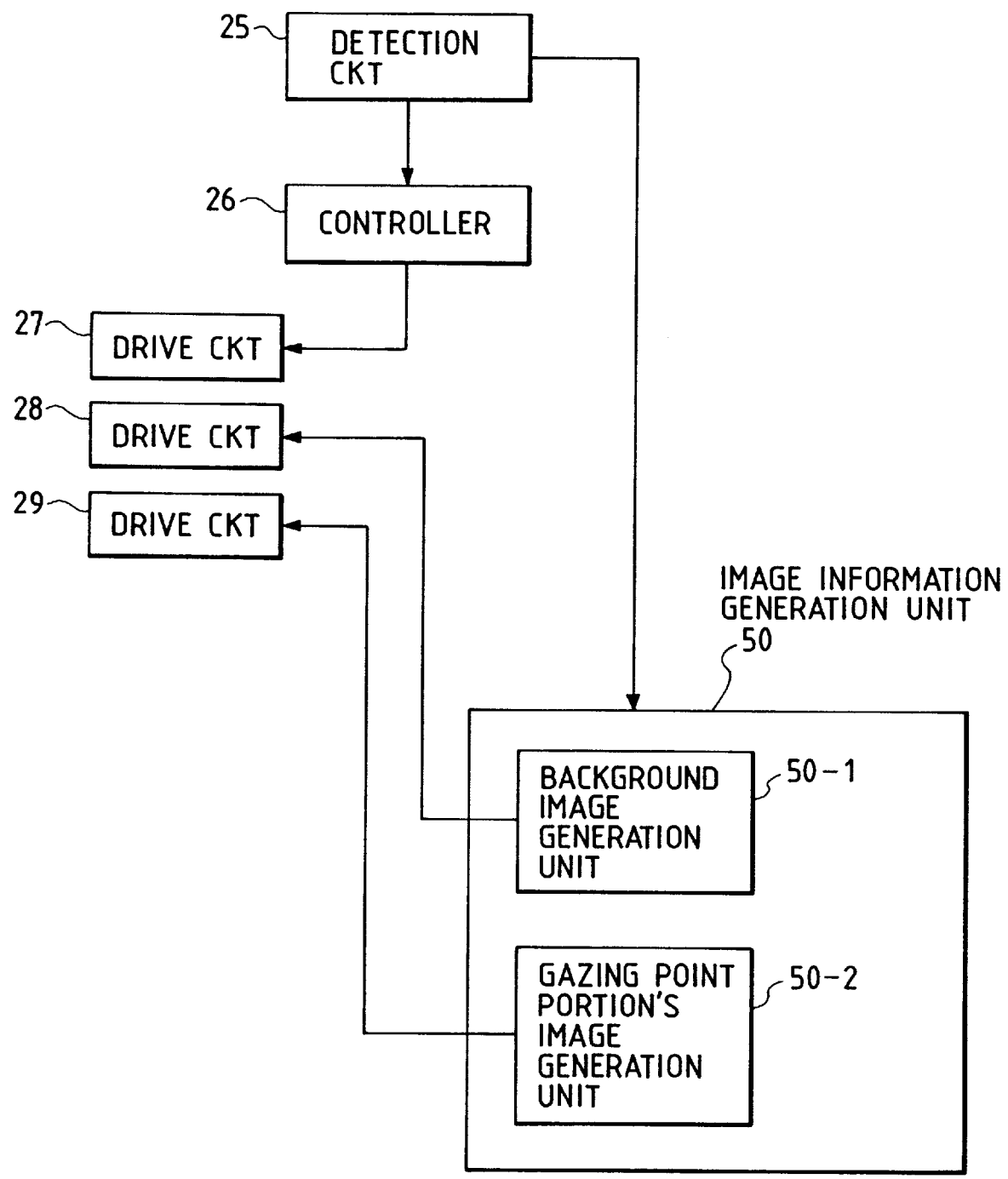
FIG. 12 shows a second embodiment of the image display apparatus of the present invention.

An improvement over the first embodiment in the above-noted point is a second embodiment shown in FIG. 12. This embodiment is almost the same as the first embodiment in apparatus construction, and differs from the first embodiment only in the method of making the original image and the method of controlling the image. In the description of this embodiment, portions differing from those of the embodiment of FIG. 2 will described preponderantly and portions common to those of the embodiment of FIG. 2 will be briefly described or not described.

FIG. 12 is a block diagram for illustrating a signal processing portion in the second embodiment of the present invention, and in FIG. 12, the same members as those in the embodiment of FIG. 2 are given the same reference numerals.

The reference numeral 50 designates an image information generation unit comprised of a computer such as a CPU or a graphic work station, or a plurality of computers effecting inter-process communication or the like and effecting synchronized calculation processes. The image information generation unit 50 causes an outside recording apparatus, not shown, or a recording apparatus in the image information generation unit 50 to generate a gazing point portion image having data necessary for image information generation in the image display area, such as, for example, the three-dimensional data of the object of display in the display area, and receiving the visual axis signal from the detection circuit 25 and to be displayed highly finely on the LCD 13 about the visual axis, and the background image to be displayed on the LCD 2 other than said gazing point portion image, in a gazing point portion's image generation unit 50-2 and a background image generation unit 50-1 in the image information generation unit 50, with fineness necessary for the image displayed on each LCD, on the basis of data necessary for said image information generation, sends these images to the drive circuits 29 and 28, respectively, and causes the images to be displayed on the LCD 13 and LCD 2, respectively. The gazing point portion's image generation unit 50-2 and the background image generation unit 50-1 generate the image information to be displayed with the fineness determined by the pixel sizes of the LCD 13 and LCD 2 and the sizes of the display portions thereof, by the conventionally used graphic calculation. The gazing point portion's image generation unit 50-2 and the background image generation unit 50-1 each may be a processor or a computer effecting said calculation, or two programs running in parallel by a computer.

The controller 26 receives a visual axis signal from the detection circuit 25, and sends a driving signal to the drive circuit 27 for rotating the half mirror 16 on two axes.

In the present embodiment, the division of the image information into the gazing point portion and the background portion can be accomplished by a calculation and operation similar to those in the division in the first embodiment of the present invention being performed within the image information generation unit 50. Further, of the image to be displayed on the LCD 2 corresponding to FIG. 6B, the image information corresponding to the portion (E) of the black signal (luminance signal 0) superposed by the image on the LCD 13 need not be generated at all, but a black display signal can be put into that portion. Also, in the present embodiment, as regards said gazing point portion's image and said background image, besides the process of separating basically one image field into the gazing point portion and the background portion as in the signal processing in the first embodiment and the above-described present embodiment, the process of allotting the gazing point portion and the background portion to the foreground and the background, respectively, is possible.

Figure 13A:
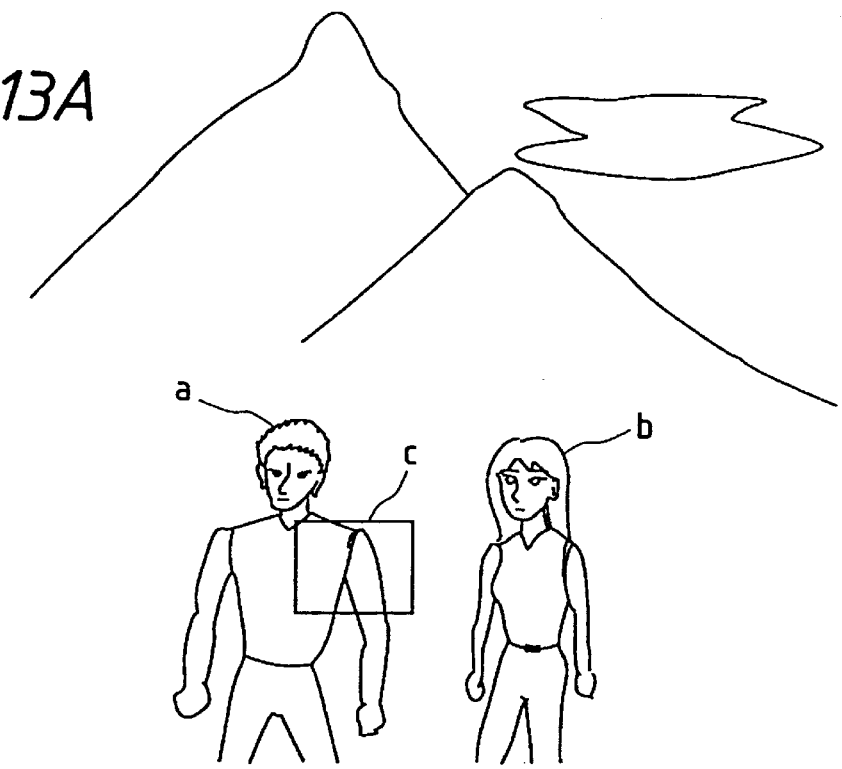
FIGS. 13A, 13B and 13C are views for illustrating the pixel arrangement of a combined image.
Figure 13B:
Figure 13C:
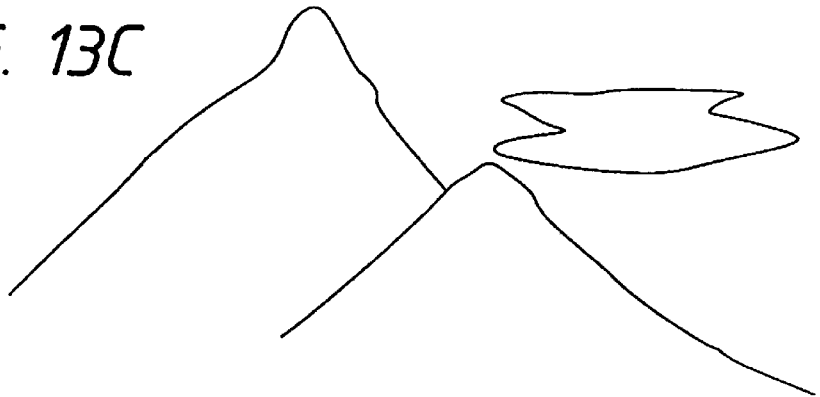

FIGS. 13A to 13C illustrate the process of allotting the gazing point portion and the background portion to the foreground and the background, respectively. FIG. 13C shows an image which becomes the background, and this image is generated by the background image generation unit 50-1 of FIG. 12. FIG. 13A shows the whole image information in the display area, and a and b in this figure indicate persons which become the foreground. In FIG. 13A, c indicates an area to be displayed on the LCD 13 about the visual axis detected by the detection circuit 25. When the area c overlaps the person a or b who is to become the foreground, the image of that portion of the foreground a or b falling within the area c is generated by the gazing point portion image generation unit 50-2 of FIG. 12. The other portion of the area c than the foreground a or b is filled up with a black display signal. FIG. 13B shows the image information generated in the gazing point portion image generation unit 50-2 by the above described process and sent to the drive circuit 29, and the hatched portions indicate the black display signal. The observer can observe the background image FIG. 13C displayed on the LCD 2 and the gazing point portion image FIG. 13B displayed on the LCD 13 while superposing these images one upon the other. When the area C does not overlap the foreground A or B, the gazing point portion image generation unit 50-2 of FIG. 12 generates a whole surface black display signal (luminance signal 0). Accordingly, the observer visually recognizes only the background image.

In the above-described process, the background image FIG. 13C displayed on the LCD 2 does not include the process of black-displaying the portion thereof superposed upon the image displayed on the LCD 13 and therefore, the observer observes the two images while completely superposing them one upon the other. In this case, it is preferable that the whole of the background image be displayed darkly as compared with the gazing point portion image.

The above-described process is carried out by the image information generation unit 50 of FIG. 12. Of course, the method already described can be carried out for the processing of the background image in the superposed portion of the gazing point portion image and the background image and the processing to the boundary between the gazing point portion image and the background image.

Figure 14:
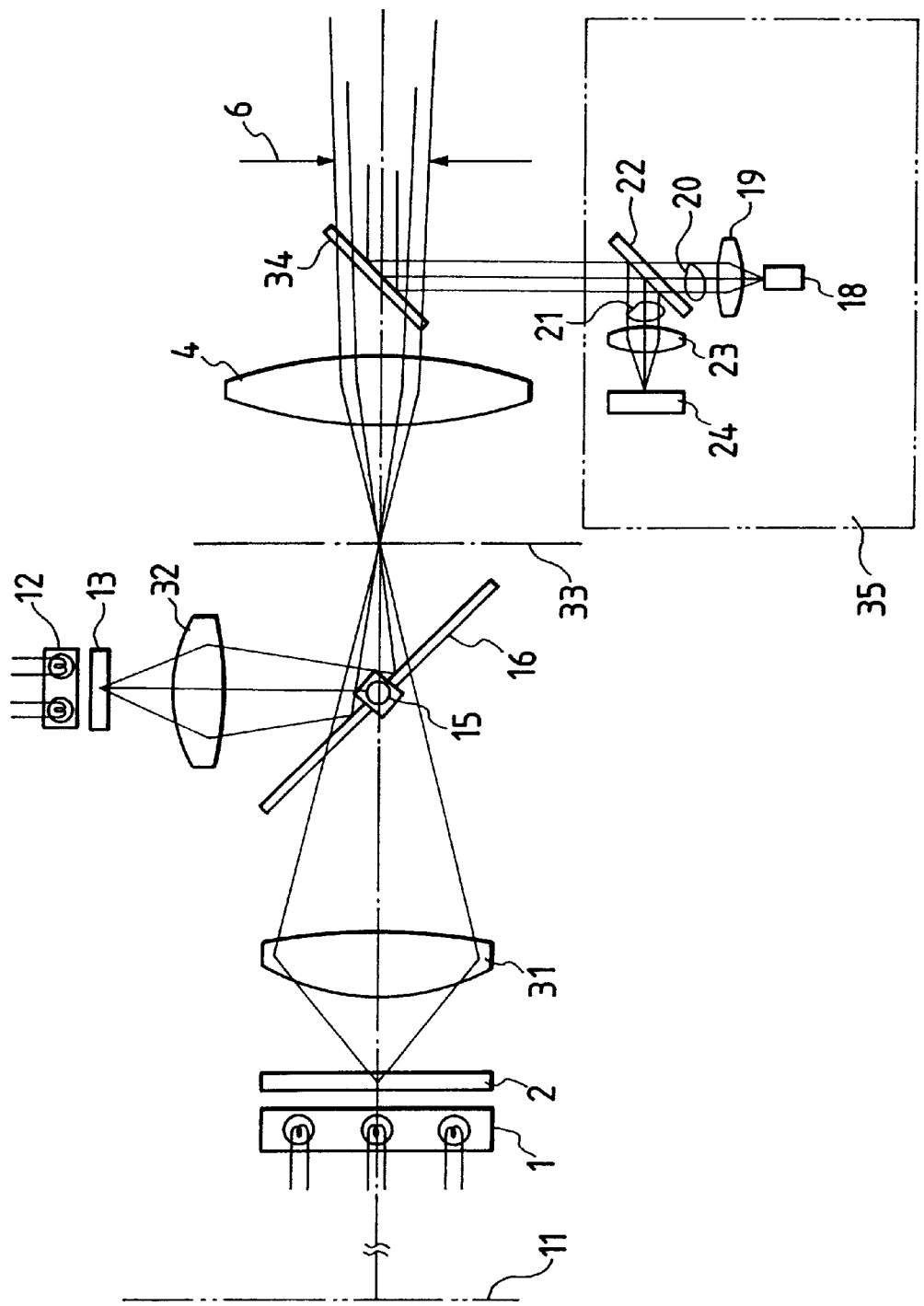
FIG. 14 shows a third embodiment of the image display apparatus of the present invention.

FIG. 14 is a schematic view showing a third embodiment of the image display apparatus according to the present invention, and in FIG. 14, the same elements as the elements shown in the first embodiment are given the same reference numerals. This embodiment differs from the first embodiment in that relay lenses 31 and 32 are used and that intermediate imaging is effected, and is the same as the first embodiment in the other points.

In FIG. 14, the image information lights from the image display elements 2 and 13 are imaged on an intermediate imaging plane 33 by the relay lenses 31 and 32, respectively. At this time, the intermediate imaging of image information 13 has its imaged position on the intermediate imaging plane controlled by a half mirror 16 having drive means 15 controlled by a controller and a drive circuit, not shown, so as to become the image information of a portion in which there is the intermediate imaging of image information 2, and the two types of image information are combined on the intermediate imaging plane 33. By observing the thus combined image through the lens 4, the observer can observe the two images on the virtual image plane 11 while superposing them one upon the other.

Again in the present embodiment, the visual axis direction detecting unit 35 is disposed at a suitable position, whereby as in the first embodiment, the displayed position of the image information on the image display element 13 is controlled. In this manner, the observer can observe highly fine image information displayed near the gazing point on the image information from the image display element 2 as the background.

Also, what combines the two images is the intermediate imaging plane 33, and this also leads to the effect that the amount of movement (the angle of rotation) of the movable half mirror 16 may be small.

Also, in the present embodiment, the size of the display portion of the LCD 13, the focal length of the relay lens 32, the size of the pixels of the LCD 2, the focal length of the relay lens 31 and the focal length of the lens 4 are set such that the size of the virtual image of the LCD 13 for highly fine display by the relay lens 32 and the lens 4 becomes integer times as large as the size of the virtual image of the pixels of the LCD 2 for wide area display by the relay lens 31 and the lens 4, and if the visual axis position signal of the visual axis direction detecting unit 35 is converted into a discrete value based on the pixel arrangement of the LCD 2 by the controller 26 and the displayed image on the LCD 13 is moved, the boundary between the displayed image by the LCD 13 and the displayed image by the LCD 2 can be made coincident with the boundary between the pixels of the image by the LCD 2.

Further, in the present embodiment, a screen can be provided at the location of the intermediate imaging plane 33 and the images can be combined on this screen and can be observed through the lens 4. In this case, the light of the combined image diffused by the screen can be observed and therefore, it becomes possible to make the N.A. of the lens 4 small, and this also leads to the effect that the downsizing of the apparatus can be achieved. In FIGS. 2 and 14, for simplification, the lens 4 is shown as a single lens, but it is desirable in imaging performance that the lens 4 be a cemented lens comprising two achromatized lenses.

Figure 15:
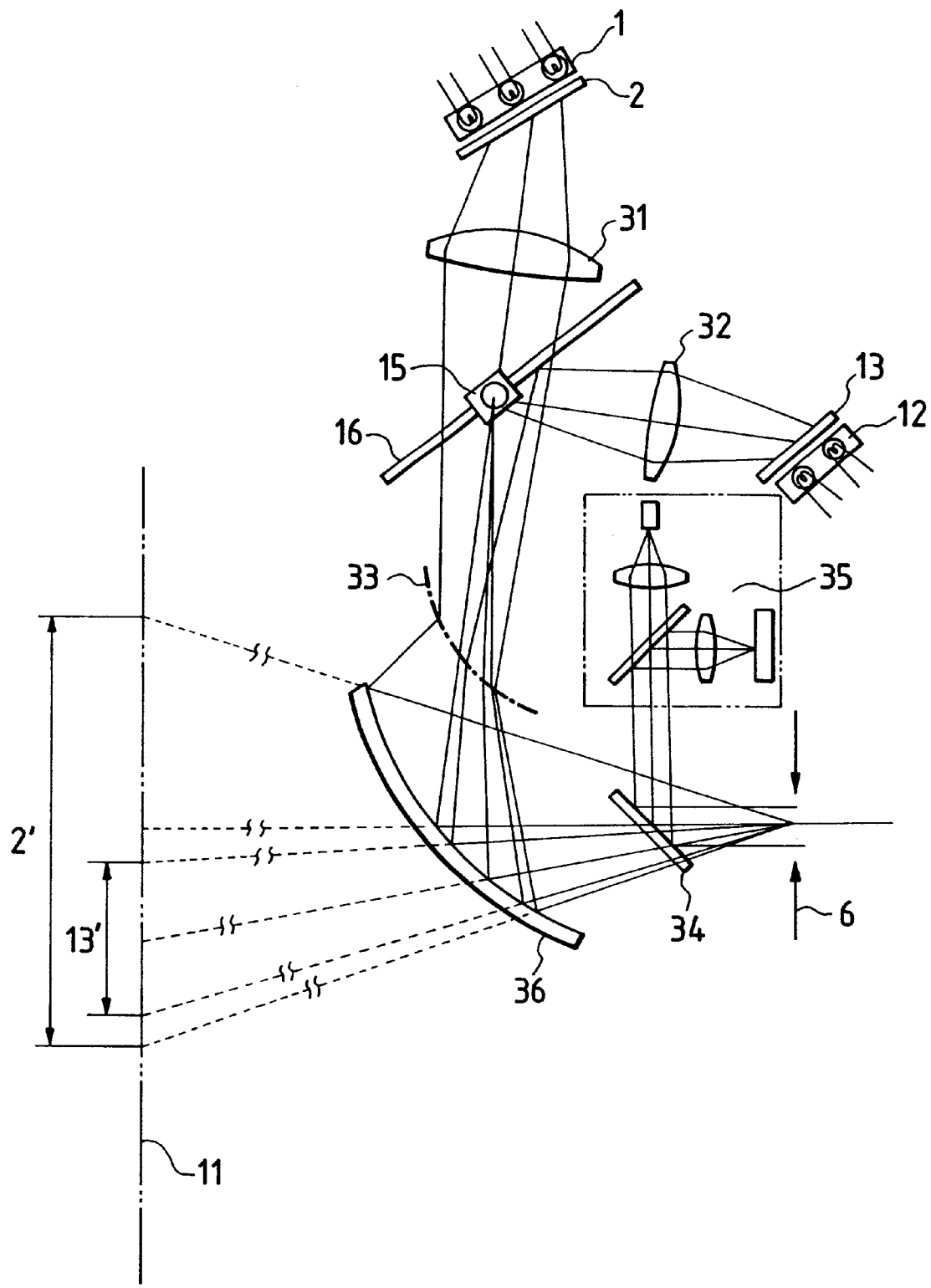
FIG. 15 shows a fourth embodiment of the image display apparatus of the present invention.

FIG. 15 is a schematic view showing a fourth embodiment of the image display apparatus according to the present invention, and in FIG. 15, the same elements as the elements shown in the third embodiment are given the same reference numerals.

In this embodiment, as compared with the third embodiment, by the use of a combiner element 36 such as a concave half mirror, other image information such as a natural landscape and the virtual images from the image display elements 2 and 13 can be superposed one upon another and three types of image information can be observed. In FIG. 15, the image information lights from the image display elements 2 and 13 are imaged on the intermediate imaging plane 33 by the relay lenses 31 and 32, respectively. The two types of image information combined on this intermediate imaging plane 33 are made into predetermined divergent light by the combiner element 36 comprising a concave half mirror and enters the observer's pupil, and can be observed as a virtual image on the virtual image plane 11.

In the present embodiment, a concave half mirror is schematically shown as the combiner element 36, but use can be made of various optical elements such as a plane half mirror, a combination of a plane half mirror and an eyepiece, or an aspherical half mirror or a reflection type hologram lens element.

Further, in the present embodiment, the imaging plane of the concave half mirror is curved and therefore, a so-called "gate optical system" arrangement is adopted so that the intermediate imaging plane of the relay lenses 31 and 32 for the image information from the image display elements 2 and 13 and the imaging plane of the concave half mirror 36 may be made coincident with each other, but these are suitably changed and designed in conformity with the characteristics of the various combiner elements as mentioned above.

As described above, in the image display apparatus of the present embodiment, the observer can observe the images on the image display elements 2 and 13 at a time while observing an image such as a natural landscape through the combiner element 36, and can observe the image information from the highly fine image display element 13 having its display position controlled by the signal from the visual axis direction detecting unit 35 always in the visual axis direction. The relay lenses 31 and 32 are not the requisite constituents of the present embodiment.

In the first to fourth embodiment, for example, single liquid crystal display elements have been described as being used as the image display elements 2 and 13, but it is also possible to use in the present invention an image display element provided with liquid crystal elements having R, G and B signals inputted thereto and displaying respective color images, and combining and displaying the color images by a dichroic mirror or the like, and a plurality of such liquid crystal elements and a color combining system may preferably be used particularly as the image display element 13 which is desired to display highly finely. Further, in lieu of the image display element 13 and the back light source 12, use can be made of an image display mechanism for driving a one-dimensional LED array by a video signal, rotating the half mirror 16 in synchronism with the video signal, scanning the LED light and displaying a two-dimensional image by the afterimage effect. Even if in this case, one-dimensional LED arrays for R, G and B, respectively, are used, the drive circuit therefor is simple and moreover, the half mirror 16 is used as two parts as means for scanning the light from the LED arrays and means for deflecting the position of the two-dimensional image as the afterimage and the other constituents are a few, and this leads to the effect that the downsizing and light weight of the image display apparatus according to the present invention can be achieved.

Figure 16:
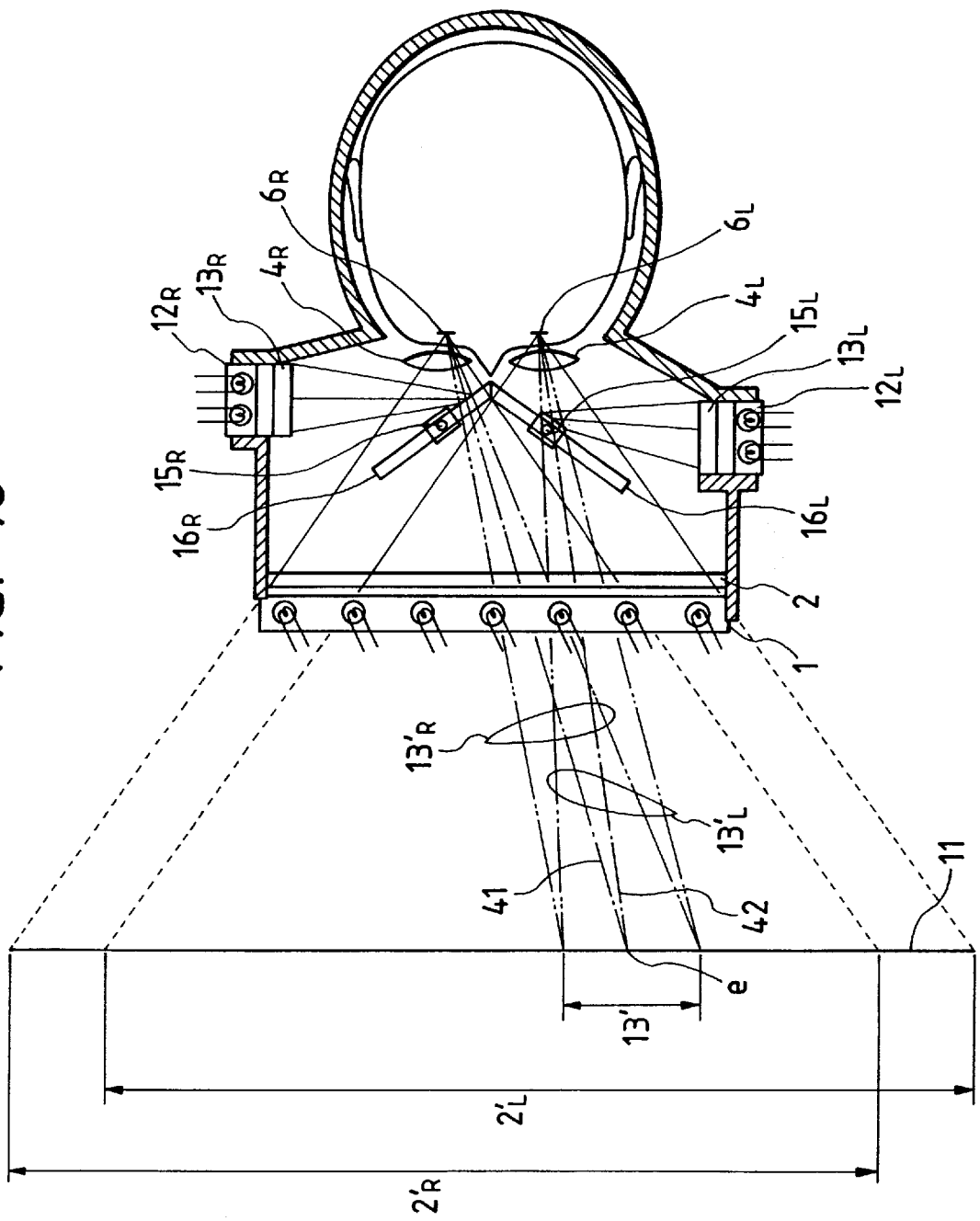
FIG. 16 shows a fifth embodiment of the image display apparatus of the present invention.

FIG. 16 is a schematic view showing a fifth embodiment of the image display apparatus according to the present invention. This embodiment is an image display apparatus designed such that a parallax image based on the parallax of two eyes is observed by the respective eyes, whereby a stereoscopic image can be observed.

The light from the back light source 1 is modulated by the image display element 2 such as a liquid crystal display element, passes through half mirrors 16R and 16L, is caused to enter respective eyes 6R and 6L by lenses 4R and 4L disposed in front of the two eyes, and forms virtual images 2'R and 2'L on the virtual image plane 11. A visual axis direction detecting unit, not shown, detects the visual axis directions 41 and 42 of the two eyes, and drive means 15R and 15L for the half mirrors 16R and 16L are controlled by a controller and a drive circuit, not shown, and image information from image display elements 13R and 13L irradiated in directions 13'R and 13'L by back light sources 12R and 12L is imaged as virtual images. At this time, the image display element 2 displays image information as the background, while the image display elements 13R and 13L display two slightly different types of image information as the parallax image of the image 13' near the gazing point e. Thus, the observer becomes able to stereoscopically observe the image of image information 2' which is near the gazing point e the observer wants to see. Also, in the present embodiment, head portion position detecting means, not shown, which has not been described in detail in the first to fourth embodiments is mounted, for example, on the top portion of the apparatus. This position detecting means can utilize a suitable method, and is one which uses magnetism and which is called a Polhemus sensor, which is based on the principle that magnetic fields produced time-divisionally from three coils orthogonal to one another which are called sources are measured by three similar coils (sensors) and the positions and postures of the sensors are found from the 3×3 bits of information, and as other methods, mention may be made of an optical method of finding the position from the images of two cameras by the principle of trigonometrical survey, an ultrasonic method of measuring the time until a signal from an ultrasonic transmitter arrives at a receiver with respect to a combination of several transmitters or receivers, and calculating the position therefrom, and a method using a mechanical link mechanism disclosed by I. E. Sutherland in *Proc. of the Full Joint Computer Conference*, vol. 33, pp. 757–764 (1968), but in the present embodiment, use is made of a method of mounting on the head portion a magnetic sensor for forming a magnetic field around it and detecting the magnetic field. A suitable calculation process is carried out by the use of a head portion position signal from such head portion position detecting means and said visual axis direction detection signal and the result is inputted to a controller, not shown, thereby varying the image on the image display element 2 which is displaying the image information 2' as the background. That is, when the observer is observing by moving his or her visual axis with his or her head portion remaining fixed, the image information 21 is not changed, but by moving or rotating his or her head portion, the observer changes the image information 2' in conformity with the movement or rotation of the head portion. Therewith, the gazing point e is found by the visual axis direction detection signal and the image information 13' near it is changed.

Reference is now had to FIGS. 17, 18A, 18B and 18C to describe the calculation process for the above-described head portion position signal and said visual axis direction detection signal and the relation with the then displayed images.

Generally, when the gazing point moves to an object to be observed (an image one wants to see), the eyeballs move correspondingly thereto, and instead of this, it is also possible to move the head portion to thereby follow the object. Usually, however, one uses these two movements to make one's visual axis follow.

Here, for simplicity, consider the matter with the rotation of center of the eyeball and the origin of the head portion position made coincident with each other. Strictly, the visual axis direction is also changed by the parallel movement of the head portion and therefore, it is necessary correct this and moreover, the origin of the head portion position (sensor position) and the center of rotation of the eyeball never coincide with each other and therefore, it is necessary to calibrate the relative position thereof in advance.

Figure 17:
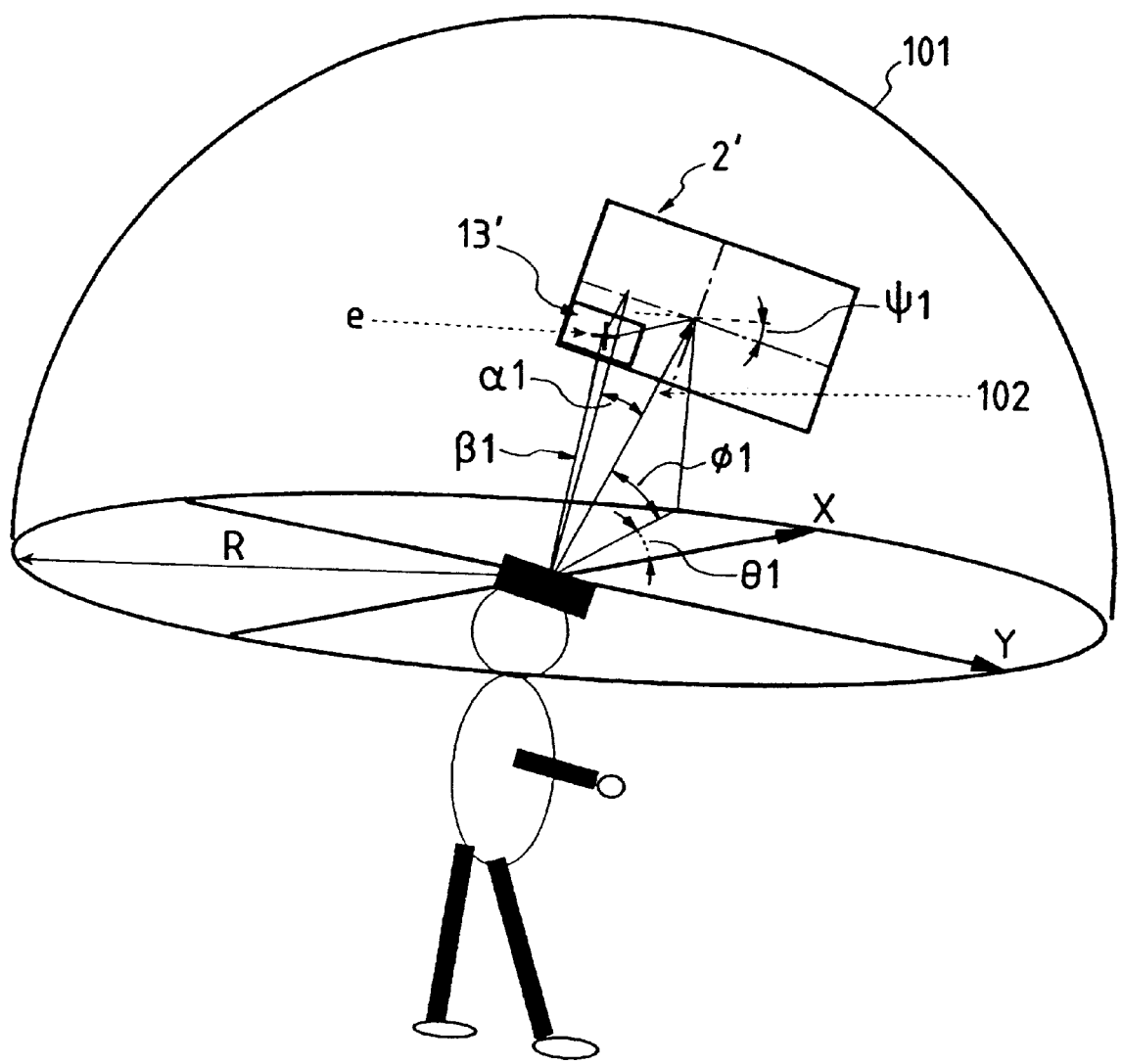
FIG. 17 is a view for illustrating the relations between a head portion position detection signal and a visual axis detection signal.

In FIG. 17, suppose an orthogonal coordinates system having, x as the front of the observer. Here, $\theta$ represents the rightward and leftward rotation of the head portion, $\phi$ represents the vertical rotation of the neck, $\psi$ represents the vertical inclination of the neck, $\alpha$ represents the horizontal rotation of the visual axis, and $\beta$ represents the vertical rotation of the visual axis.

Also, in FIG. 17, the reference numeral 101 corresponds to the virtual image plane of FIG. 16 and here, it schematically indicates a hemisphere always spaced apart by a predetermined distance R from the observer, but actually, the virtual image plane is a plane to which the direction 102 of the observer's head portion is a normal. As a matter of course, this plane (virtual image plane) is sometimes not a strict plane depending on the aberration characteristics of the lenses 4R and 4L of the display apparatus, or is sometimes consciously curved relative to the observer in order to give the so-called "surrounding effect".

At this time, as shown, the observer is gazing at a point e at the left lower corner (leftward at an angle of $\alpha 1$ and downward at an angle of $\beta 1$) with his head rotated leftwardly by $\theta 1$ from the front, his neck rotated upwardly by $\phi 1$ and moreover his neck inclined rightwardly by an angle of $\psi 1$. From the aforedescribed assumption, the horizontal movement of the head portion is O and therefore, by converting a variation in the eyeball motion coordinates system by inclining the neck into the original orthogonal coordinates system, the direction of the visual axis can be calculated and at the same time, the position and direction of the head can also be determined.

Now, in the following of the visual axis, when the gazing point is in an effective field of view (which is generally said to be 15 degrees to right and left), an image can be recognized by only the motion of the eyeball, and when the gazing point moves beyond this range, the movement of the head also becomes necessary.

Figure 18A:
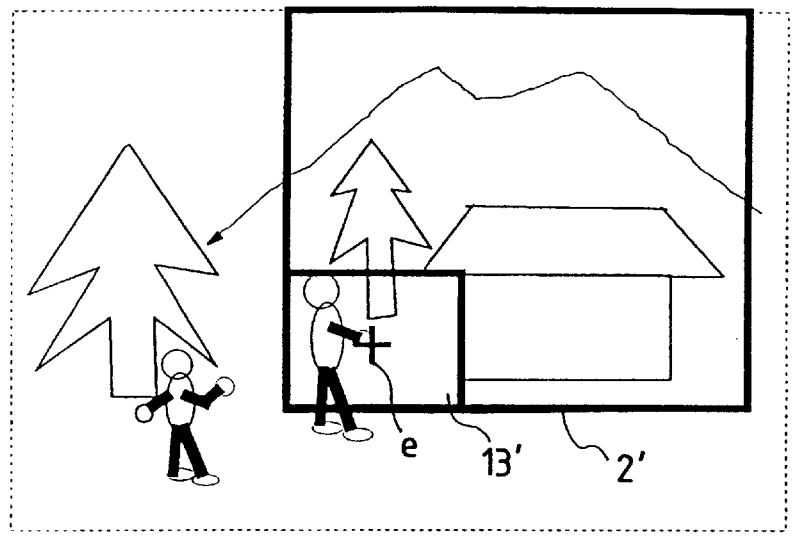
FIGS. 18A, 18B and 18C are views for illustrating the relations between a detection signal and an image display state.

Accordingly, in the present embodiment, the field angle of a highly fine image 13' near the gazing point is 30 degrees and the field angle of an image 2' of a wide field angle is 80 degrees, but in an extreme case as shown in FIG. 18A (a case where the gazing point e is at the left lower corner of the image information 2' of a wide field angle), the angles $\alpha$ and $\beta$ of the visual axis direction each are 25 degrees (here, for simplicity, the shapes of the images 2' and 13' are supposed as a square) and exceed the range of the aforementioned effective field of view. Accordingly, to recognize the substance of the image 2' in detail, it is necessary to rotate the head portion in that direction so that the gazing point e may fall within the effective field of view.

Figure 18B:
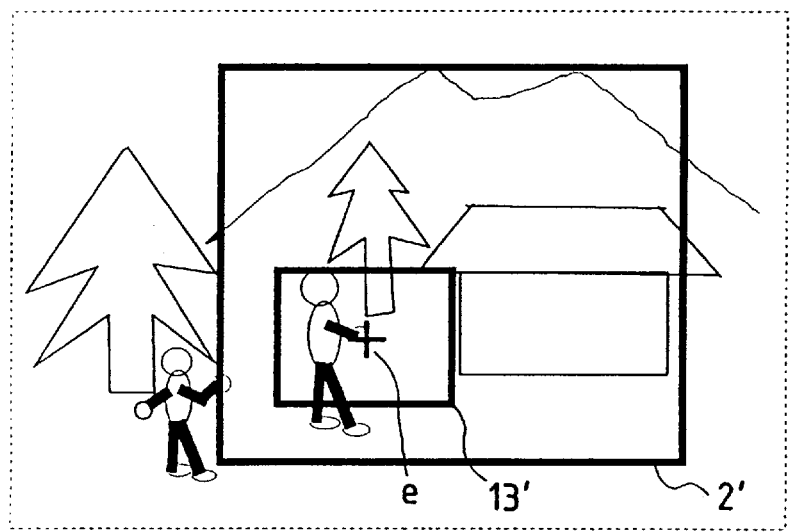
Figure 18C:
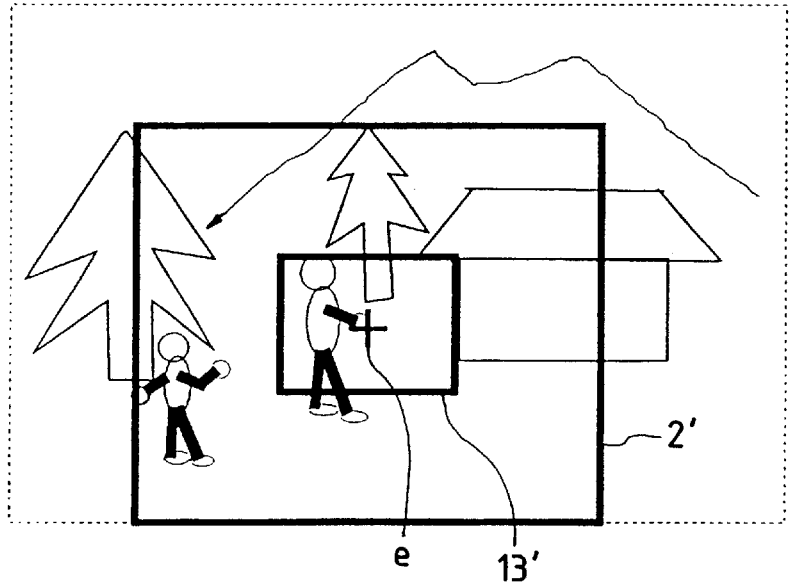

As a result, as shown in FIG. 18C, the image 13' must become the image of the substantially central portion of the image 2' and therefore, in conformity therewith, the display image information of the image 2' displaying the background image is changed. FIG. 18B showing the relation between the images 2' and 13' schematically shows the image display state in the course wherein the observer rotates his head portion to change from the display state of FIG. 18A to the display state of FIG. 18C.

As described above, the image display apparatus of the present embodiment can also detect the position of the head portion to thereby vary the image information 2' in conformity with a change in the position of the head portion and highly finely display the portion the observer wants to see (the vicinity of the gazing point). Of course, this is also possible in the first to fourth embodiments. The present invention is characterized in highly finely displaying the portion of the image information 2' the observer wants to see (the vicinity of the gazing point), and in the present embodiment, it is further possible to observe this portion the observer wants to see as a stereoscopic image.

In such case, the image information to be displayed on the image display elements 13R and 13L can be made into parallax images corresponding to the respective eyes.

Moreover, it is known that a stereoscopic image is better in image quality than a plane image of the same frequency band. (See, for example, NHK Technical Institute, *R & D*, No. 15, pp. 69–75, September 1991.) Consequently, by constructing the image display apparatus according to the present invention, there is also provided the effect that the quality of the image in the vicinity of the gazing point can be further improved. Also, as a matter of course, if the apparatus construction described in the first to fourth embodiments is prepared in two sets and respective parallax images are displayed to the respective eyes, there could be an effect similar to that of the present embodiment. In such case, the image information 2' as the background can also be displayed as parallax images to the respective eyes and at this time, there can be realized an image display apparatus by which the whole image field is telescopically observed and the vicinity of the gazing point can be observed as a more highly fine stereoscopic image. In each embodiment, for the area in which of the image information displaying a wide range as the background, the image information displaying a narrow range is superposed, there may be brought about a state in which nothing is displayed, or for the area in which both overlap, the same images may be displayed while being superposed one upon the other.

Also, if two liquid crystal display elements of the same screen size and the same pixel density are used and the magnifications of the relay lenses corresponding thereto are changed, it will be possible to create an image of relatively rough pixels showing the background and an image of relatively fine pixels corresponding to the vicinity of the gazing point. In this case, the two liquid crystal display elements used are the same, and this is excellent in massproductivity.

Description will now be made of a photographing apparatus for the images to be displayed by the above-described image display apparatus.

Figure 19A:
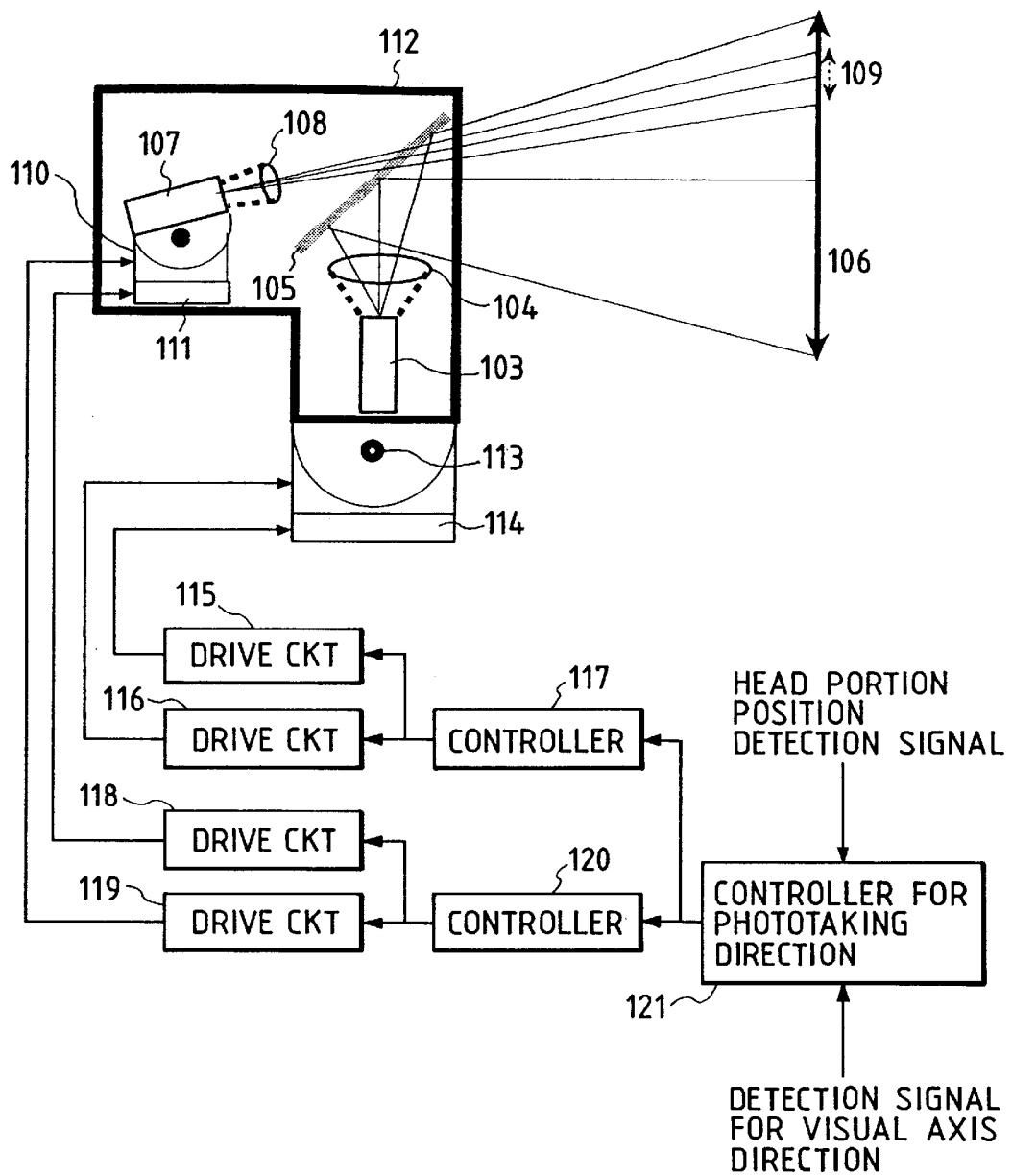
FIG. 19A shows a first embodiment of the image photographing apparatus of the present invention.

FIG. 19A is a schematic diagram showing a first embodiment of the image photographing apparatus according to the present invention.

A TV camera 103 having a wide angle lens 104 mounted thereon photographs a forward field of view 106 over a relatively wide range through a half mirror 105. Also, a TV camera 107 uses a lens such as a standard lens or a telephoto lens to photograph a forward field of view 109 of a relatively narrow field angle through a half mirror 105, and records an image in an image memory, not shown. In the present embodiment, the former field angle is set to about 80 degrees and the latter field angle is set to about 30 degrees. At this time, a controller 121 for photo-taking direction has inputted thereto by a suitable method a photo-taking direction intended by a photographer, controls a goniostage 113 having a driving unit such as a pulse motor and an automatically rotatable stage 114 by a controller 117 with the aid of respective drive circuits 116 and 115, and photographs an image 106 of a wide angle.

An image at a position particularly observed by the photographer is controlled by a controller 120, and a goniostage 110 having a driving unit such as a pulse motor and an automatically rotatable stage 111 are driven by drive circuits 119 and 118, respectively, to thereby introduce a highly fine image 119.

When the photographing apparatus of the present embodiment and the display apparatus shown, for example, in FIG. 2 are used, there can be constructed a system very effective as a visual angle sensor in the teleexistence technique. That is, in the foregoing, the image photographed by the photographer's intention and moreover, only the portion observed by the photographer are recorded highly finely, but in the display apparatus of FIG. 2, the position of the head and the visual axis of the observer (the wearer of the display apparatus) are detected. This signal is inputted to the controller 121 for photo-taking direction to thereby photograph an image of a wide field angle and a highly fine image, and the image of a wide angle (the output from the TV camera 103) is displayed on the image display element 2 of FIG. 2 and the highly fine image (the output from the TV camera 107) is displayed on the image display element 13, whereby the observer can observe the image around the location at which the photographing apparatus of the present embodiment is disposed as if he was there.

Figure 19B:
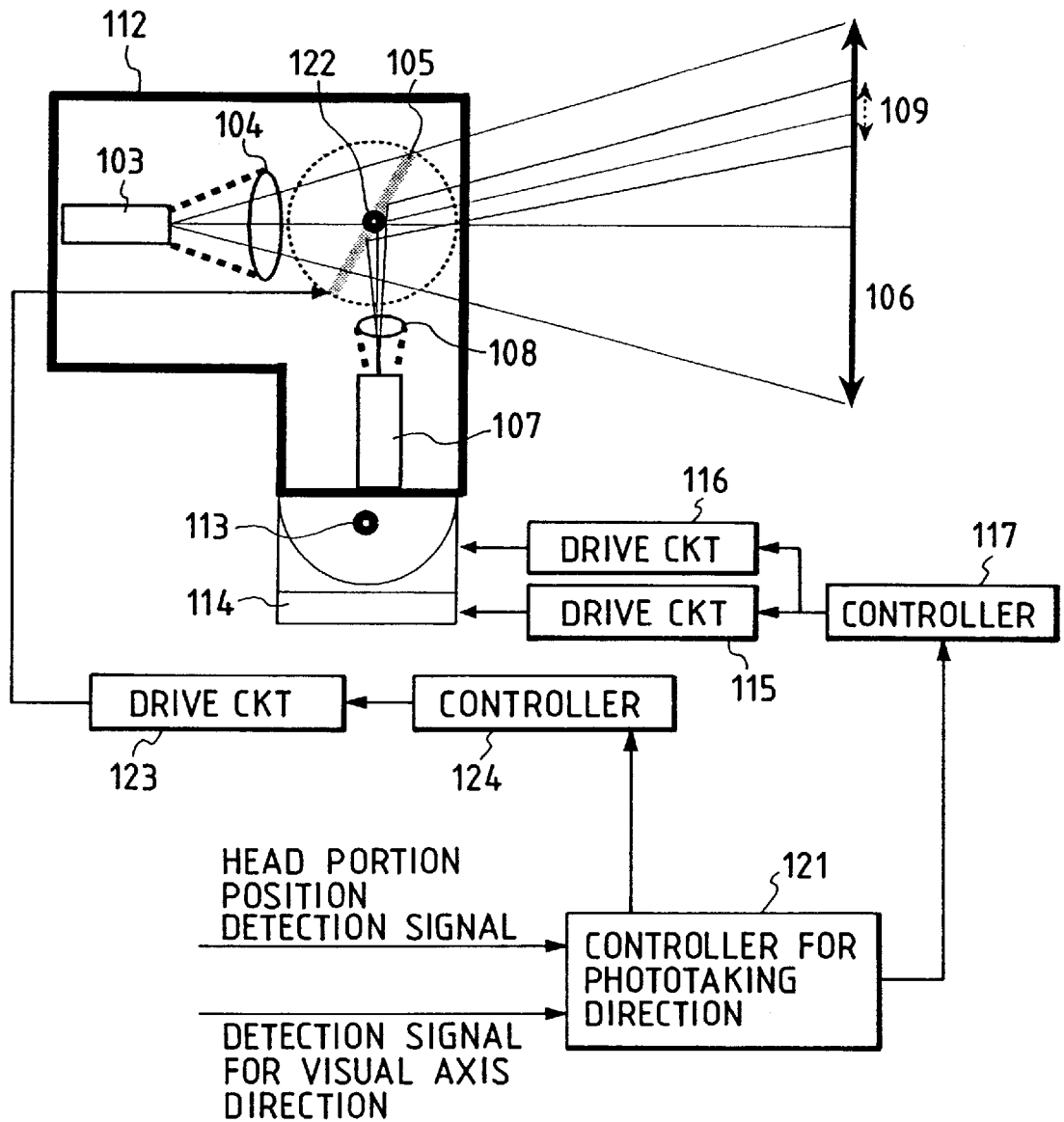
FIG. 19B shows a modification of the first embodiment of the image photographing apparatus of the present invention.

The drive means used in the photographing apparatus of the present invention are not limited to the goniostage having a driving unit such as a pulse motor and the automatically rotatable stage, but can also be realized by the use of the half mirror 105 having, for example, drive means 122 capable of rotatively driven on two axes, and an example of such construction is shown in FIG. 19B. Of course, as the construction of such drive means, various constructions could be employed if means for photographing the image of a wide angle and means for photographing the highly fine image can pan and tilt vertically and horizontally and further among them, the highly fine photographing means can pan and tilt vertically and horizontally.

Figure 19C:
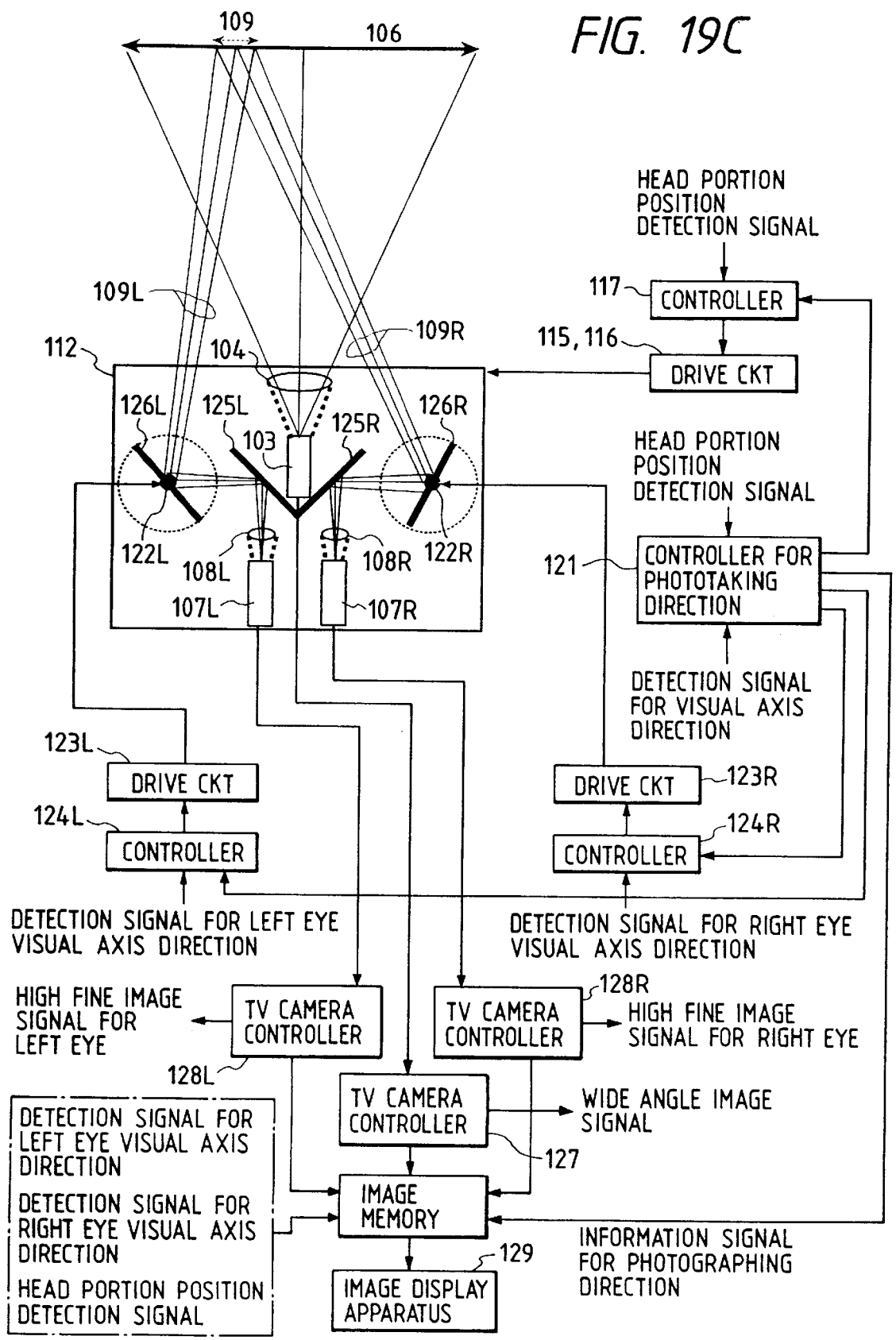
FIG. 19C shows a second embodiment of the image photographing apparatus of the present invention.

FIG. 19C is a schematic diagram showing a second embodiment of the image photographing apparatus according to the present invention.

Again in this embodiment, it is possible to introduce an image reflecting the photographer's intention by the use of the controller 121 for phototaking direction, but here, description will be made of a case where the image photographing apparatus of the present embodiment is used with the image display apparatus shown in FIG. 4.

The signals from the head portion position detecting means and visual axis detecting means, not shown, which have been described in connection with FIG. 16 are inputted to the controller 121 for phototaking direction on almost real time. In this controller 121, the movement of the head relative to the detection signal for visual axis direction is corrected by the use of the head portion position detection signal to thereby find the direction in which the observer is facing and the direction in which the observer is gazing, and the whole photographing apparatus 112 is turned to the direction in which the observer is facing by the controller 117 and drive circuits 115 and 116, whereby an image 106 of a wide angle is photographed by the TV camera 103 having the wide angle lens 104 mounted thereon. Also, in order to photograph images 109R and 109L as seen from the directions of the right eye and left eye by TV cameras 107R and 107L, respectively, the directions of mirrors 126R and 126L rotatable on two axes are controlled by controllers 124R and 124L, respectively, on the basis of the signal from the visual axis detecting means.

The images thus photographed are outputted from respective TV camera controllers 127, 128R and 128L and inputted to the aforedescribed display apparatus.

That is, the image 106 of a wide angle photographed by the present apparatus is displayed on the image display element 2 of FIG. 16 and forms the virtual image 2'. Also, the images from the TV cameras 107R and 107L are displayed on the image display elements 13R and 13L, respectively, of FIG. 16 and become the virtual image 13'. At this time, as is apparent from FIG. 19C, parallaxes are created in the respective images. Accordingly, the observer can observe the image in the direction 109 photographed by the photographing apparatus of the present embodiment as the stereoscopic image 13' by the use of the display apparatus of FIG. 16. At this time, as previously described, the image 2' may be low in pixel density, and if the image pickup element density of the TV camera 103 is the same as that of the TV camera 107, the image transmission from the TV camera controller 127 to the image display apparatus can more enhance the image compression rate than the image transmission from the TV camera controller 128 to thereby heighten the transfer rate.

The image compressing method used here may be one of various methods including the conventional methods H.261, JPEG and MPEG.

Further, to record the image in the present embodiment, the information of the direction in which the observer is facing when he sees by means of the display apparatus of FIG. 16 and the direction in which the is gazing is required and therefore, the signal from the head portion position detecting means and the visual axis detection signal are recorded in advance on the respective images, and the images coinciding with the head portion position and the visual axis direction when the observer has observed wearing the display apparatus are random-accessed from an image memory 129, whereafter they can be inputted to the respective display elements of the display apparatus.

What is claimed is:

1. An image display apparatus comprising:
 a first flat display panel for displaying first image information with a plurality of pixels;
 a second flat display panel for displaying second image information with a plurality of pixels;

visual axis detecting means for detecting an observer's visual axis direction;

optical means for combining a first image from said first flat display panel and a second image from said second flat display panel, wherein said second image has a size that is an integer multiple of a pixel pitch of said first image when said first and second images are combined; and driving means for moving said second image with the pixel pitch of said first image based on an observer's visual axis direction signal of said visual axis detecting means.

2. An apparatus according to claim 1, wherein the area of said images superposed one upon the other is not displayed by said first flat display panel.

3. An apparatus according to claim 1, wherein the pixel density in the central portion of said second image is higher than the pixel density of said first image and the pixel density in the marginal portion of said second image is substantially the same as the pixel density of said first image when said images are combined.

4. An apparatus according to claim 1, wherein the luminance in the central portion of said second image is higher than the luminance of said first image and the luminance in the marginal portion of said second image is substantially the same as the luminance of said first image when said images are combined.

5. An apparatus according to claim 1, wherein said first and second images are combined on an intermediate imaging plane through respective relay lenses, are enlarged as virtual images and are turned to the observer's pupil.

6. An apparatus according to claim 5, wherein said relay lenses have different imaging magnifications.

7. An apparatus according to claim 1, wherein said image display apparatus is provided correspondingly to each of the observer's left and right eyes.

8. An apparatus according to claim 7, wherein said second flat display panel corresponding to the left and right eyes display parallax image information corresponding to the respective eyes.

9. An apparatus according to claim 7, wherein said first flat display panel is used in common.

10. An image display apparatus comprising:

a first flat display panel for displaying first image information with a plurality of pixels;

a second flat display panel for displaying second image information with a plurality of pixels;

visual axis detecting means for detecting an observer's visual axis direction; head portion position detecting means for detecting the position of the observer's head position; optical means for combining a first image from said first flat display panel and a second image from said second flat display panel, wherein said second image has a size that is an integer multiple of a pixel pitch of said first image when said first and second images are combined;

driving means for moving said second image with the pixel pitch of said first image based on an observer's visual axis direction output signal of said visual axis detecting means; and image information changing means for changing said first image information and said second image information on the basis of the output signal of said visual axis detecting means and an output signal of said head portion position detecting means.

11. An apparatus according to claim 10, further comprising an image memory having recorded therein the image all around a predetermined position, and wherein a part of said image memory is inputted as said first image information to said first flat display panel in conformity with the output signal of said head portion position detecting means.

12. An apparatus according to claim 10, wherein the area of said images superposed one upon the other is not displayed by said first flat display panel.

13. An apparatus according to claim 10, wherein said first and second images are combined on an intermediate imaging plane through respective relay lenses, are enlarged as virtual images and are turned to the observer's pupil.

14. An apparatus according to claim 13, wherein said relay lenses have different imaging magnifications.

15. An apparatus according to claim 10, wherein said image display apparatus is provided correspondingly to each of the observer's left and right eyes.

16. An apparatus according to claim 15, wherein said second flat display panel corresponding to the left and right eyes display parallax image information corresponding tot he respective eyes.

17. An apparatus according to claim 16, wherein said first flat display panel is used in common.

18. An image display method comprising:

first displaying step of displaying first image information by a first flat display panel having a plurality of pixels;

second displaying step of displaying second image information by a second flat display panel having a plurality of pixels;

visual axis detecting step of detecting an observer's visual axis direction;

combining step of combining a first image from said first displaying step and a second image from said second displaying step, wherein said second image has a size that is an integer multiple of a pixel pitch of said first image when said first and second images are combined; and driving step of moving said second image with the pixel pitch of said first image based on an observer's visual axis direction signal of said visual axis detecting step.

19. A method according to claim 18, wherein the area of said image superposed one upon the other is not displayed in said first displaying step.

20. A method according to claim 18, wherein the pixel density in the central portion of said second image is higher than the pixel density of said first image and the pixel density in the marginal portion of said second image is substantially the same as the pixel density of said first image when said images are combined.

21. A method according to claim 18, wherein the luminance in the central portion of said second image is higher than the luminance of said first image and the luminance in the marginal portion of said second image is substantially the same as the luminance of said first image when said images are combined.

22. A method according to claim 18, wherein said first and second images are combined on an intermediate imaging plane through respective relay senses, are enlarged as virtual images and are turned to the observer's pupil.

23. A method according to claim 22, wherein said relay lenses have different imaging magnifications.

24. A method according to claim 18, wherein said steps are provided correspondingly to each of the observer's left and right eyes.

25. A method according to claim 24, wherein said second displaying step corresponding to the left and right eyes display parallax image information corresponding to the respective eyes.

26. A method according to claim 24, wherein said displaying step is used in common.

27. An image display method comprising:

first displaying step of displaying first image information by a first flat display panel having a plurality of pixels;

second displaying step of displaying second image information by a second flat display panel having a plurality of pixels;

visual axis detecting step of detecting an observer's visual axis direction;

head portion position detecting step of detecting a position of an observer's head; combining step of combining a first image from said first displaying step and a second image from said second displaying step, wherein a pixel pitch of said first image is an integer multiple of a pixel pitch of said second image when said first and second images are combined;

driving step of moving said second image with the pixel pitch of said first image based on an observer's visual axis direction output signal of said visual axis detecting step: and image information changing step of changing said first image information and said second image information on the basis of the output signal of said visual axis detecting step and an output signal of said head portion position detecting step.

28. A method according to claim 27, further comprising the image memory step of recording image information all around a predetermined position, and wherein part of the image information recorded by said image memory step is inputted as said first image information to first image generating means in conformity with the output signal of said head portion position detecting step.

29. A method according to claim 27, wherein the area of said images superposed one upon the other is not displayed by said first displaying step.

30. A method according to claim 27, wherein said first and second images are combined on an intermediate imaging plane through respective relay lenses, are enlarged as virtual images and are turned to the observer's pupil.

31. A method according to claim 30, wherein said relay lenses have different imaging magnifications.

32. A method according to claim 27, wherein each of said steps is provided correspondingly to each of the observer's left and right eyes.

33. A method according to claim 32, wherein said second displaying step corresponding to the left and right eyes display parallax image information corresponding to the respective eyes.

34. A method according to claim 32 wherein said first displaying step is used in common.

35. An image display apparatus comprising:

a first flat display panel for displaying first image information with a plurality of pixels;

a second flat display panel for displaying second image information with a plurality of pixels, said second image information being part of said first image information;

visual axis detecting means for detecting an observer's visual axis direction;

optional means for combining a first image from said first flat display panel and a second image from said second flat display panel by superposing the second image on the first image, moving said second image relative to said first image in conformity with an output signal from said visual axis detecting means and turning it to the observer's pupil, and image display changing means for changing said first image information and said second image information on the basis of the output signal of said visual axis detecting means, wherein the pixel densities of said first image and said second image are adapted to each other at the boundary between the displayed images to make the marginal portion of said second image coincident with the boundary between the pixels of said first image when said images are combined, and wherein the adaptation of the pixel densities is maintained when the second image being superposed on the first image is moved in accordance with the detected observer's visual axis direction.

* * * * *

UNITED STATES PATENT AND TRADEMARK OFFICE
CERTIFICATE OF CORRECTION

PATENT NO.  : 6,445,365 B1
DATED       : September 3, 2002
INVENTOR(S) : Naosato Taniguchi et al.

It is certified that error appears in the above-identified patent and that said Letters Patent is hereby corrected as shown below:

Column 6,
Line 18, "rotation e" should read -- rotation θ --

Column 7,
Line 63, "FIG. 3 illustrates" should read -- FIGS. 3A to 3D illustrate --

Column 11,
Line 47, "numeral 21 designates" should read -- numeral 2' designates --

Column 17,
Line 7, "information 21" should read -- information 2' --

Column 20,
Line 53, "which the is" should read -- which he is --

Column 22,
Line 57, "relay senses," should read -- relay lenses, --

Signed and Sealed this

Twenty-ninth Day of April, 2003

JAMES E. ROGAN
*Director of the United States Patent and Trademark Office*